United States Patent [19]

Endo

[11] Patent Number: 4,864,589

[45] Date of Patent: Sep. 5, 1989

[54] SPREAD SPECTRUM POWER LINE COMMUNICATIONS

[75] Inventor: Kaoru Endo, Osaka, Japan

[73] Assignee: NEC Home Electronics Ltd., Osaka, Japan

[21] Appl. No.: 889,006

[22] Filed: Jul. 24, 1986

[30] Foreign Application Priority Data

| Jul. 24, 1985 | [JP] | Japan | 60-163801 |
| Jul. 24, 1985 | [JP] | Japan | 60-163802 |
| Jul. 24, 1985 | [JP] | Japan | 60-163803 |
| Jul. 31, 1985 | [JP] | Japan | 60-169406 |
| Aug. 23, 1985 | [JP] | Japan | 60-185146 |
| Aug. 23, 1985 | [JP] | Japan | 60-185147 |
| Aug. 23, 1985 | [JP] | Japan | 60-185149 |

[51] Int. Cl.⁴ ......................................... H04L 27/30
[52] U.S. Cl. ........................................... 375/1
[58] Field of Search ............................ 375/1, 36

[56] References Cited

U.S. PATENT DOCUMENTS

| 4,086,504 | 4/1978 | Ezell et al. | 375/1 |
| 4,307,380 | 12/1981 | Gander | 375/1 |
| 4,328,586 | 5/1982 | Hansen | 375/36 |
| 4,438,519 | 3/1984 | Bose | 375/1 |
| 4,468,792 | 8/1984 | Baker et al. | 375/1 |
| 4,475,208 | 10/1984 | Ricketts | 375/1 |
| 4,517,679 | 5/1985 | Clark et al. | 375/1 |
| 4,554,668 | 11/1985 | Deman | 375/1 |
| 4,641,322 | 2/1987 | Hasegawa | 375/1 |
| 4,644,523 | 2/1987 | Horwitz | 375/1 |
| 4,724,435 | 2/1988 | Moses et al. | 375/1 |

FOREIGN PATENT DOCUMENTS

| 0095959 | 12/1983 | European Pat. Off. | 375/1 |
| 0086935 | 5/1985 | Japan | 375/1 |

OTHER PUBLICATIONS

"Spread Spectrum Systems", Wiley & Sons, N.Y., N.Y. (1984), 2nd Ed., Dixon pp. 79-82.
B. Hirosaki et al., "A Power Line Home Bus system Using Spread-Spectrum Communication Technologies", Jun. 5-7, 1985, pp. 28-29, New York, US.
D. I. Hariton et al., "AC Power Line Modem for Consumer and Industrial Environments", Jun. 5-7, 1985, pp. 30-31, New York, US.
B. Hirosaki et al., "Spread-Spectrum Multiple access Data Loop", vol. 4 of 4, New Orleans, La. Nov. 29-–Dec. 3, 1981, pp. G.8.5.1-G.8.5.6, New York, US.
P. K. VanDer Gracht et al., "Pseudo-Noise Signalling for Power Line Carrier Applications", pp. 79-84, New York, US, IEEE Transactions on Power Delivery, No. 1, Jan. 1986.
Yasko Kadokawa & Kenichi Tsukamoto, Journal of the Institute of Electronic and Communication Engineers of Japan, "Spread Sprectrum Communication Systems and their Application [I]& [II]", Sept. & Oct. 1982, vol. 65, Nos. 9 & 10, pp. 965-971 & 1053-1059, respectively.

Primary Examiner—Salvatore Gangialosi
Attorney, Agent, or Firm—Cushman, Darby & Cushman

[57] ABSTRACT

This invention is directed to various improvements in spread spectrum power line communications. One aspect of the invention relates to collision avoidance between varius "slave" unit transmitters trying to send messages to a single "master" unit receiver by detecting whether the transmission path is in use and refraining from transmitting if it is. Other aspects of the invention relate to controlling the frequencies of spread spectrum data messages transmitted, using gold codes to identify the slave units, and switching frequency bands on the powe line to avoid frequencies where there has been a deterioration of transmission. In each embodiment, the signal modulated over the power line is modulated by a signal which is synchronous with A.C. power flowing through the power line used for communications. The transmitted spread spectrum modulated signal then may be demodulated to isolate the transmitted data even when changes in the transmission characteristics of the power line (due to load changes and the like) occur.

30 Claims, 23 Drawing Sheets

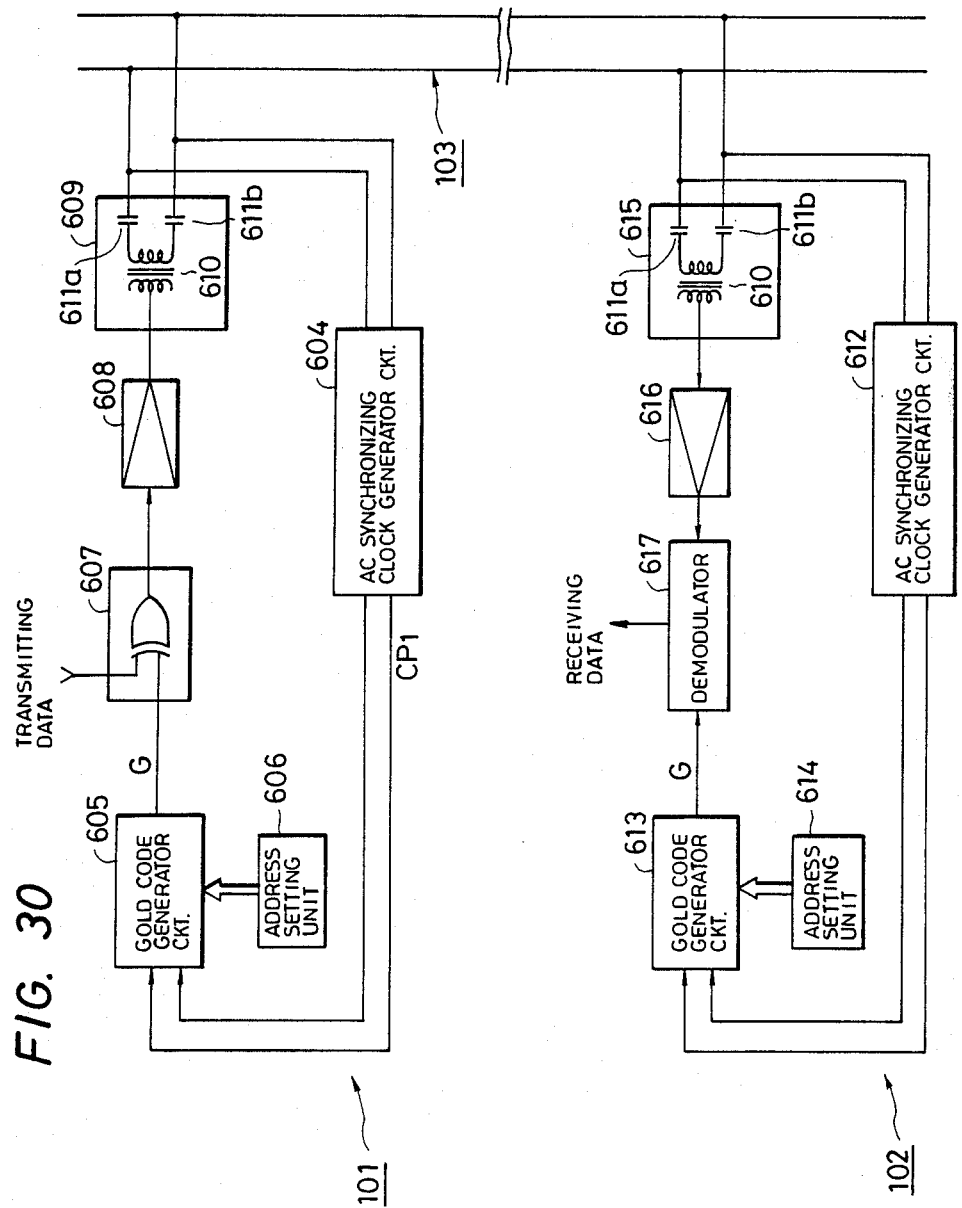

SPREAD SPECTRUM POWER LINE COMMUNICATIONS

BACKGROUND OF THE INVENTION

This invention relates in general to power line communications. More specifically, it provides various improvements for systems wherein a central station "master" monitors and communicates with a plurality of "slave" units using a power line as a transmission line for communications.

A security system is one example of a system that requires centralized monitoring of slave units by a master. Various sensors such as infrared intrusion, window - glass damage and fire detection sensors are installed in target areas to be protected. These sensors are connected to a supervisory unit through individual transmitters and circuits respectively for centralized monitoring.

A problem of conventional "wired" master/slave systems is that, as the number of slave units and monitoring range increase, the amount of wiring required becomes excessive. A power line providing power to the various slave units can be used for communications to reduce the amount of wiring, but there are many factors which make it difficult to communicate reliably over a power line. For example, it is usually necessary to provide an arrangement for the prevention of signal line disconnections and quick detection of such disconnection faults.

Various schemes have been proposed to establish and maintain communications over a commercial power line. A transmission line generally utilizes single side band modulation for data signals, whereas a frequency or phase modulation is used for a distribution line. However, a power line is not designed for signal transmission.

It is electrically noisy, has a wide range of impedances, and its transmission characteristics fluctuate with line load. As a consequence, reliable signal transmission and particularly high speed data transmission have not been possible using conventional techniques.

There has been study undertaken in the applications of so called "spread spectrum" communications. The Journals of the Institute of Electronic and Communications Engineers of Japan, Sept/82, p 965 & Oct/82, p 1063, for example, disclose the principles of and comments on the applications of spread spectrum technology.

A spred spectrum communications system relies on so-called Pseudo-Noise (PN) diffusion or direct diffusion. Thus, a narrow-band data signal is transmitted over a wide-band transmission line by diffusing the spectrum thereof using an M sequential code as spurious noise signal, and even if the transmission characteristics of the transmission medium have a plurality of zero points resulting from the line load, a transmitted signal will not be substantially affected thereby. Moreover, even if narrow-band noise is blended with a transmitted data signal, the S/N ratio can be improved using correlation at the receiver.

However, the application of spread spectrum technology to power line communication systems permitting one master unit to simultaneously monitor a plurality of slave units still poses problems. For example, if multiple slave units simultaneously send data signals to the master unit, the data signals overlap and cannot be discriminated from one another. To prevent the slave units from sending the data signals to the master unit simultaneously, polling schemes have been used. In effect, the master takes turns looking at each slave successively to see if a given slave has a message to send to the master. Such systems require additional hardware, however, such as a CPU to control the polling, and such hardware is expensive.

SUMMARY OF THE INVENTION

The present invention provides various improvements in power line communications. Using the arrangements of the present invention, it is possible to achieve reliable and inexpensive centralized monitoring of a plurality of slave units by one master unit through a power line without the need to use a CPU (Central Processing Unit) for polling.

According to one aspect of the invention (See FIG. 4–FIG. 9), signals transmitted by a plurality of slave units to a master unit are prevented from overlapping one another. A slave unit having a message to transmit first checks for the presence of any spread spectrum modulated signal on the power line. If there is already a spread spectrum signal on the line, it does not transmit. However, if the line is judged to be free by the absence of any spread spectrum signal, it transmits its data message using spread spectrum modulation.

Each slave unit generates a first M sequential transmission code for use in spread spectrum modulating a data signal and a second M sequential transmission code having the same code pattern as that of the first M sequential transmission code. The second M sequential transmission code is added to the spread spectrum signal modulated by the first M sequential transmission code only when the data signal is produced. This "combined" signal is transmitted onto the power line. A slave unit transmitting a signal is discriminated from the others by setting the phase difference inherent in each slave unit between the M sequential transmission codes.

The phase of the second M sequential transmission code produced by each slave unit is successively shifted from one unit to the next. Whether or not any other slave unit is transmitting a signal is determined by obtaining the correlation between the signals received through the power line.

The master unit produces a first M sequential reception code for use in demodulating a received spread spectrum modulated signal, the first M sequential reception code having the same code pattern as that of the first M sequential transmission code, and a second M sequential reception code for use in correlating with the second M sequential transmission code, the second M sequential reception code having the same code pattern as that of the second M sequential transmission code. The codes are synchronized by successively varying the phase of the clock pulse providing a basis for the generation of the first and second M sequential reception codes on the basis of a period greater than the period wherein the second M sequential reception code is produced until the correlation of the second M sequential reception code to the second M sequential transmission code received from the slave unit is obtained.

The received spread spectrum modulated signal is multiplicatively demodulated while only the phase of the first M sequential reception code is shifted at least in the period wherein the code is produced when the correlation between the second M sequential transmission code and the second M sequential reception code is obtained. Phase shifting is stopped when the demodulated signal is obtained so as to extract the receiving signal, and the slave unit transmitting a signal is discriminated from the others according to the difference in phase between the first and second M sequential reception codes.

Transmission-to reception phase synchronization is secured by locking a clock pulse generator circuit installed in each of the slave units and the master unit to a power supply for supplying A.C. through the power line.

Slave units are prevented from transmitting signals simultaneously. Each slave unit is allowed to spread spectrum modulate with M sequential codes and transmit the thus modulated signal only after confirming the absence of any spread spectrum modulated signal flowing through the power line.

Each slave unit transmits data with the first and second M sequential transmission codes produced for spread spectrum modulating in such a state that each code has the phase difference inherent in each slave unit and transmits the combination of the second M sequential transmission code and the spread spectrum modulated signal added thereto so that any slave unit transmitting a signal may readily be discriminated from the others by obtaining the difference in phase between the first M sequential reception code for use in demodulating the receiving spread spectrum modulated signal on the part of the master unit and the second M sequential reception code for obtaining the correlation thereof to the second M sequential transmission code contained in the receiving signal.

Each slave unit is, if a data signal to be transmitted is produced, caused to transmit the combination of the spread spectrum modulated signal obtained by multiplicatively modulating the data signal with the first M sequential transmission code and the second M sequential transmission code to the power line. In consequence, each slave unit is readily capable of noticing any other slave unit, if any, transmitting a signal by successively shifting the phase of the second M sequential transmission code to find whether or not the correlation of the code to the signal supplied through the power line is obtainable.

The clock pulse generator circuit in each of the slave and master units is arranged to produce the clock pulse whose phase is locked to the A.C. power line frequency to ensure the acquisition of the correlation of the second M sequential reception code produced with the clock pulse as a basis to the second M sequential transmission code received and the multiplicative demodulation of the receiving spread spectrum modulated signal by means of the first M sequential reception code.

Another aspect of the invention relates to a line lock communication arrangement using a power source for synchronization of operations between a transmitter and a receiver (See FIG. 10–FIG. 12). FIGS. 1–3 provide some background for understanding the line lock aspect of the invention.

FIG. 1 is a block diagram showing one example of an application of the spread spectrum technique to power line communication. Data is modulated using a pseudonoise (PN) signal scattering or direct scattering, and particularly, an M-series code is used as the Pseudo Noise (PN) signal. The M-series code is the longest one of a linear code series generated by both a multistage shift register and a feedback circuit and is established so that instantaneous values every period are distributed in the state of quasi-noise. In FIG. 1, a transmitter 101 and a receiver 102 are coupled to each other via a power line 103. A clock oscillator 104 generates a clock pulse CP having a frequency of 250 KHz. A zero-crossing detector 105 generates a zero-crossing detection Z every time a zero-crossing point of the A.C. power carried by power line 103 is detected. An M-series code generator 106 generates in response to CP and Z an M-series code as a PN signal.

In the FIG. 2 arrangement, an M-series code generator is shown in more detail and includes a three-stage shift register 106a and an exclusive OR gate 106b for exclusively ORing the output signals of the second and third stages of the shift register to thereby feedback the resulting signal to the input terminal. The M-series code generator generates from the last stage thereof an M-series code having a maximum code length of $2n-1$ (wherein n is the number of shifting stages). The M-series code generator is arranged such that upon reception of a zero-crossing detection signal Z supplied from 105, all of flip-flop circuits FF1 to FF3 constituting the respective stages of three-stage shift register 106a are reset to "1".

In FIG. 1, spread spectrum modulator 107 product-modulates (exclusively ORs) the transmission data and the M-series code. This converts the data signal to be transmitted into a spread spectrum modulated signal. A coupler 108 including a transformer 109, a capacitor 110a and a capacitor 110b, receives the modulated signal supplied from spread spectrum modulator 107 through a filter (not shown) for eliminating low frequency components and transfers the modulated signal to power line 103.

In receiver 102, a clock oscillator 110 generates a clock pulse CP the same as that of 104 in transmitter 101. A zero-crossing detector 111 for generating a zero-crossing detection signal Z whenever a zero-crossing point of the A.C. supply supplied through power line 103 is detected. An M-series code generator 112 in receiver 102 has the same construction as M-series code generator 106 in transmitter 101. A coupler 113 "extracts" the spread spectrum modulated signal from power line 103. Coupler 113 is constituted by a transformer 114 and capacitors 115a and 115b. A spread spectrum demodulator 116 multiplies the modulated signal supplied from coupler 113 through a receiver amplifier as well as a low-frequency cut-off filter (both not-shown) with the M-series code supplied from M-series code generator 112, so as to make a correlation detection of the data signal.

Upon turning the power switch on, clock oscillator 104 and clock oscillator 110 respectively provided in transmitter 101 and receiver 102 generate clock pulses CP having the same period. Zero-crossing detector 105 and zero-crossing detector 111 provided in transmitter 101 and receiver 102, respectively, generate zero-crossing detection signals Z indicating each zero-crossing point of the A.C. supply flowing in power line 103, the zero-crossing detection signals Z generated from both zero-crossing detector 105 and zero-crossing detector 111 being in synchronism with each other.

When the zero-crossing detection signal Z is generated from zero-crossing detector 105 at the point in time t1 of FIG. 3(f), all the respective outputs of the flip-flop circuits FF1 to FF3 are reset to "1" because three-stage shift register 106a receives the zero-crossing detection signal Z as a reset signal. Accordingly, the output signal of exclusive OR gate 106b becomes "0" as shown in FIG. 3(d). Next, when the clock pulse CP rises at time t2 of FIG. 3(e), three-stage shift register 106a reads-in in the output signal of exclusive OR gate 106b and shifts so that the outputs of the flip-flop circuits FF1 to FF3 become "0", "1" and "1", respectively. When the clock pulse rises at time t3 of FIG. 3(e), the output of exclusive OR gate 106b is maintained "0" and three-stage shift register 106a receives the "0" output signal of exclusive OR gate 106b to cause shifting so that the output signals of the flip-flop circuits FF1 to FF3 become "0", "0" and "1", respectively. Being arranged to receive the output signals of the flip-flop circuits FF2 and FF3 as its input signals, exclusive OR gate 106b then produces a "1" signal as shown in FIG. 3(d) if the output signals of the flip-flop circuits FF2 and FF3 do not accord with each other. The output signal of exclusive OR gate 106b is then coupled to three-stage shift register 106a at the leading edge of a next clock pulse CP. By repetition of such a procedure in order, an M-series code having a period T1 between the points in time t2 and t9 as shown in FIG. 3(c) is obtained. Because the M-series code is generated in accordance with reset processing based on the zero-crossing detection signal Z, the M-series code is thus in synchronism with the A.C. power in power line 103.

The M-series code generated in synchronism with the A.C. supply is subject to product-modulation with the transmission data synchronized with the high-frequency clock pulse CP in the spread spectrum modulator 107 so that a narrow band transmission signal is transmitted as a modulated signal in which the narrow band transmission data are spectrum-scattered uniformly over a wide band. After low-frequency components are removed by a filter (not-shown), the modulated signal is amplified to a predetermined level by the transmitter amplifier and supplied to power line 103 via coupler 108.

In receiver 102, M-series code generator 112 generates an M-series code the same as that of the M-series code generator, on the basis of the clock pulse CP provided by clock oscillator 110. Because M-series code generator 112 is arranged to be reset by the output signal Z of zero-crossing detector 111 for detecting a zero-crossing point of the A.C. supply flowing in power line 103, the generated M-series code is synchronized with the A.C. supply, that is, synchronized with the M-series code generated by the M-series code generator. Coupler 113 receives the modulated signal generated by transmitter 101 from power line 103. The received modulated signal is amplified by a receiver amplifier (not shown), and low-frequency components thereof are removed by a filter. Then, the modulated signal is supplied to the spread spectrum demodulator 116. The spread spectrum demodulator 116 multiplies the M-series code supplied from M-series code generator 112 with the received modulated signal which has been transmitted in the spectrum-scattered state, so that reception data is isolated.

In the FIG. 1 spread spectrum communication arrangement, the respective transmitter and receiver M-series code generators generate respective M-series codes on the basis of the zero-crossing point of the A.C. supply flowing in the power line to synchronize the M-series codes with each other. However, the arrangement has a limitation.

Namely when the frequency of the clock pulse is selected to be 250 KHz, the one chip width of the M-series code is 1/250=4 $\mu$ sec. In general, the phase difference between the respective M-series codes used for modulation and demodulation in the transmitter and receiver must be within (+/−) 0.5 chip for normal communication. However, when the zero-crossing detector detects a zero-crossing point, the timing of zero-crossing detection may be shifted by about 10 $\mu$ sec, because of the characteristics of the detector, and accordingly, the generated M-series code has a phase shift by about 10 $\mu$ sec to thereby make it impossible to carry out normal communication. Further, because the respective clock pulses generated in the transmitter and receiver are not synchronized with each other, there may be a phase difference between them of one clock period at the maximum, so that the respective M-series codes are shifted in phase from each other by (+/−) 1 chip to make it impossible to carry out normal communication. Furthermore, in the case where an M-series code is generated in synchronism with a zero-crossing point, the operation of generating the M-series code is forced to reset and is stopped upon the detection of a zero-crossing point because of discord in the period between the M-series code and the A.C. supply, so that it becomes impossible to carry out normal communication in the vicinity of a portion of the period of the M-series code where a zero-crossing detection point is included. In addition, for example, in the case where the transmitter is disposed relatively far from the receiver, a phase difference in the A.C. supply between the transmitter and receiver sides often arises in accordance with changes in load on power line 103, so that the M-series codes respectively generated in synchronism with a zero-cross point of the A.C. supply at the transmitter and receiver sides may be shifted from each other correspondingly, thereby making it impossible to carry out normal communication.

A further aspect of the present invention thus provides a line lock communication method and apparatus in a spectrum scattering power line carrier frequency communication system. Line lock clock generators are provided in a transmitter and in a receiver, respectively, each of the line lock clock generators being arranged to generate first and second clock pulses, the first clock pulse being synchronized in phase with an A.C. supply flowing in a power line used as a transmission line and having a frequency KN times as high as that of the A.C. supply, the second clock pulse being synchronized with the A.C. supply and having a frequency K/2 times as high as that of the A.C. supply, where K is an integer and N is the maximum period length of the M-series code generated from each of the M-series code generators respectively provided in the transmitter and receiver, each of the M-series code generators generating the M-series code having the first clock pulse as a basic clock pulse to thereby carry out modulation of transmission data and demodulation of the received modulated signal.

The M-series codes are synchronized in period with the A.C. power flowing in the power line used a transmission line, so that the M-series codes respectively generated in the transmitter and receiver in synchronism with the A.C. supply are made to completely accord with each other. Furthermore, in this case, the generation of the respective M-series code synchronized with the A.C. supply is controlled in such a manner that a first clock pulse as a basic clock synchronized with the A.C. supply by a phase lock loop and a second clock pulse having a period $\frac{1}{2}$N times as short as that of the first clock pulse are generated to thereby synchronize the generation period of the M-series code owing to the first clock pulse with the second clock pulse. This method is unlike the conventional case where the generation of the M-series code is forcedly synchronized with the A.C. supply by forcedly effecting resetting upon detection of a zero-crossing point of the A.C. supply. The generation of the M-series is controlled such that if the synchronization is once established the state of synchronization can be kept to thereby make it possible to prevent disorder of the generated M-series codes from occurring.

Another technique according to the present invention relates to the use of a gold code to enhance the ability of multiple slave units to communicate with a master unit without data signal collision (See FIG. 13–FIG. 18).

Each slave unit may supply a spread spectrum modulated signal to the power line by multiplicatively modulating transmitting data using each predetermined gold code, and the master unit may obtain the transmitting data by successively switching the gold code and multiplicatively demodulating the received spread spectrum modulated signal.

Each slave unit multiplicatively modulates transmitting data using a predetermined gold code different from what is used by the others. Accordingly, even if more than one slave unit transmits spread spectrum modulated signals simultaneously, the master unit is capable of discriminating received data from what is transmitted by the others by successively shifting the gold code and demodulating the received spectrum-diffusion modulated signal, so that one master unit is capable of readily intensively monitoring the plurality of slave units connected to one and the same power line.

Even using a spread spectrum technique for power line communication, it is difficult to communicate if the transmission characteristics of a power line deteriorate significantly. It becomes necessary to increase the transmission output of the transmitter. If the transmission output is increased, however, other equipment connected to the same power line is affected by a transmission signal, because a frequency band of the transmission signal is made broad by spectrum scattering. That is, for example, in an interphone utilizing the power line carrier frequency communication, any one of six-frequency bands each of (+/−) 15 KHz having center frequencies such as 230 KHz, 270 KHz, 310 KHz, 350 KHz, 390 KHz, and 430 KHz, as shown in FIG. 21 is used, so that the interphone utilizing the power line carrier frequency communication is influenced on its used frequency band by the spread spectrum modulated signal having a broad frequency band when the transmission output is increased.

Another aspect (See FIG. 19–FIG. 21) of the invention relates to this problem. As shown in those figures, an additional modulation is provided using a second clock pulse. The spread spectrum modulation signal is modulated again by using this second clock pulse, a frequency of the first clock pulse used for generating the M-series code utilized for the spread spectrum modulation, a series length of the M-series code, and a frequency of the second clock pulse, which are selected so as to set the transmission output to have spectrum distribution not affecting a used frequency band of other equipment.

The relationship between the frequency of the first clock pulse used for generating the M-series code and the code length of the M-series code, or the relationship between the two foregoing factors and a frequency of the second clock pulse used for further modulating the spectrum scattering modulation signal into which the transmission data are modulated by using the M-series code are selected so as not to overlap the spectrum distribution of the transmission signal onto a used frequency band of other equipment, so that the other equipment connected to the power line is not affected.

Another aspect of the invention (FIG. 22–FIG. 24) relates to code correlation for improving data transmission through a power line. A voltage-controlled variable gain receiving amplifier is provided on the output side of the receiving coupler, and a level controlling M-series code which is the same in code pattern as the receiving M-series code is produced while its phase is swung, so as to obtain its correlation with the output signal of the aforementioned voltage-controlled variable gain receiving amplifier to obtain the correlation output including a peak value. A signal corresponding to the difference between a signal concerning the peak value of the correlation output and a received signal level setting a reference value is applied to the voltage-controlled variable gain receiving amplifier, whereby the received signal level is made constant.

The correlation with the M-series code included in the modulation signal transmitted by the transmitter unit is obtained at the receiver unit while the correlation condition is being swung in the range which includes the peak of the correlation output, and the difference signal between the signal concerning the peak of the correlation output and the reference value is used as a level control signal, whereby the control can be positively achieved without being affected by the S/N ratio of the transmission path.

Another aspect of the invention (FIG. 25–FIG. 29) relates to frequency band switching. When the transmission characteristic of the power lines deteriorates for some reason, the band of frequencies used for data transmission is automatically switched to a different band to continue communication. To determine whether the transmission characteristics have deteriorated, a correlation is performed between the spectrum diffusion modulation signal supplied to the power lines and a transmission data modulating M-series code. When the correlation is less than a predetermined reference value, the transmission band is switched. The switching of the transmission band is achieved by changing the frequency of the clock pulse which is used to subject to multiplication modulation the M-series code used for spread spectrum modulation of the transmission data, or by changing the frequency of the clock pulse which is used for multiplication modulation of the spectrum diffusion modulation signal.

Another aspect of the invention (FIG. 30–FIG. 32) relates to quickening polling and response by omitting the address data of a receiver unit.

In a typical power line communication system, a receiver is designated by adding the address data of the receiver to the head transmitting data and, for this reason, polling and response speed are delayed. Particularly when the system is used as a control system, the disadvantage of the slow transmission speed thereof for spectrum-diffusion will become obvious.

A receiver unit is provided with a gold code inherent in it and is caused to demodulate a receiving modulated signal, and a transmitter unit is made to modulate transmitting data by producing the gold code set in the intended receiver as the address thereof. Each transmitter unit modulates transmitting data using a particular gold code for demodulation set in a receiver unit address, and it thus becomes unnecessary to add the address signal of a receiver at the head of transmitting data. In consequence, polling and response speed are quickened.

BRIEF DESCRIPTION OF THE DRAWINGS

FIG. 30 is a block diagram of yet another spread spectrum power line carrier communication arrangement according to the present invention.

DETAILED DESCRIPTION OF THE PREFERRED EMBODIMENTS

Figure 4:
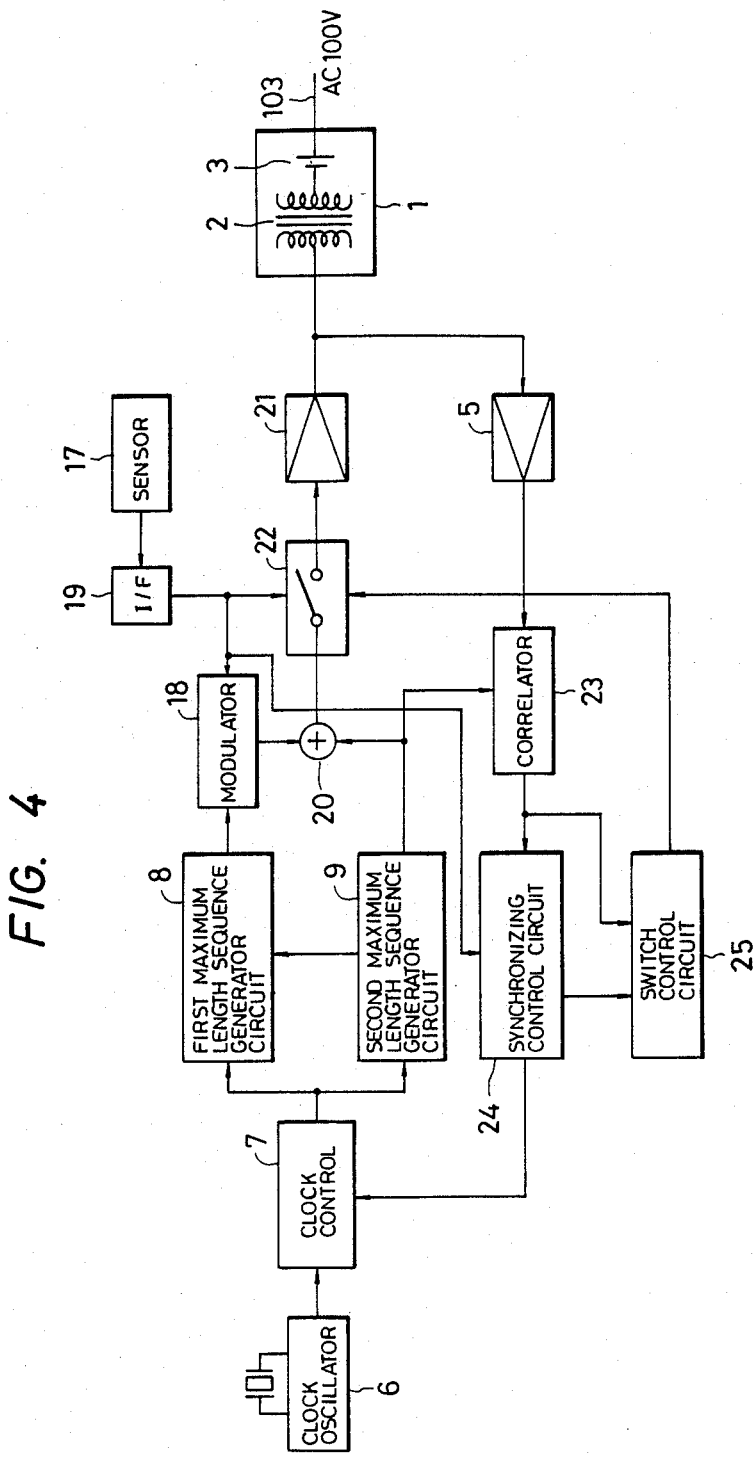
FIG. 4 is a block diagram of a transmitter (slave) unit for a spread spectrum communication arrangement according to the invention wherein slave unit transmissions are prevented from overlapping.
Figure 6:
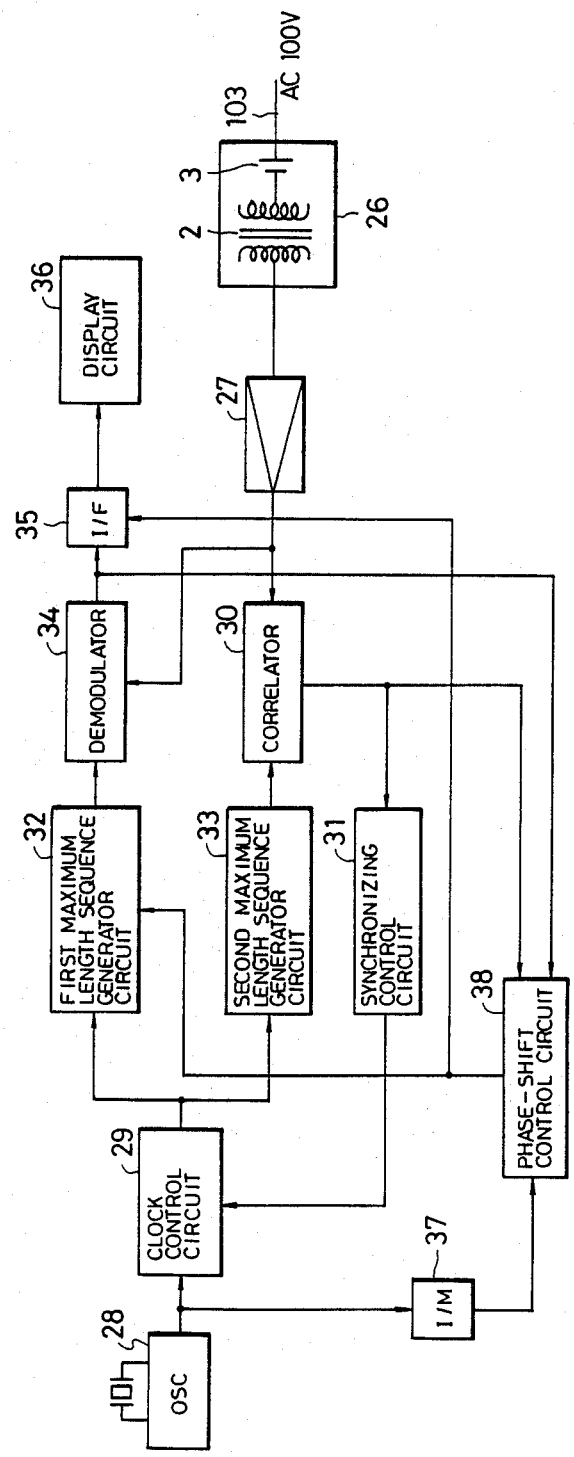
FIG. 6 is a block diagram of a receiver (master) unit that operates with slave units of the type shown in FIG. 4.

FIGS. 4 and 6 are block diagrams illustrating spread spectrum carrier frequency communications arrangements according to the present invention, FIG. 4 showing one of N slave units (transmitters) connected to a power line 103 and FIG. 6 showing a master unit (receiver) also connected to power line 103.

The slave unit shown in FIG. 4 comprises a coupler 1 including a transformer 2 and a capacitor 3, the coupler being used to provide to and receive from power line 103 a spread spectrum modulated signal. A receiving amplifier 5 connected to coupler 1 amplifies a signal received from power line 103. A clock oscillator 6 provides a stable clock pulse of, e.g., 450 KHz. A clock control circuit 7 varies the phase of the clock pulse supplied by clock oscillator 6 according to the output signal of a synchronizing control circuit 24, clock control circuit 7 being of standard construction, e.g., a PLL (Phase Locked Loop).

First and second M sequential code generator circuits 8 and 9 produce M sequential codes synchronous with pulses from clock control circuit 7, the M sequential codes produced by both generator circuits having the same pattern and phases successively shifted from each other by, e.g., a unit of one bit according to the address of each slave unit.

Figure 5:
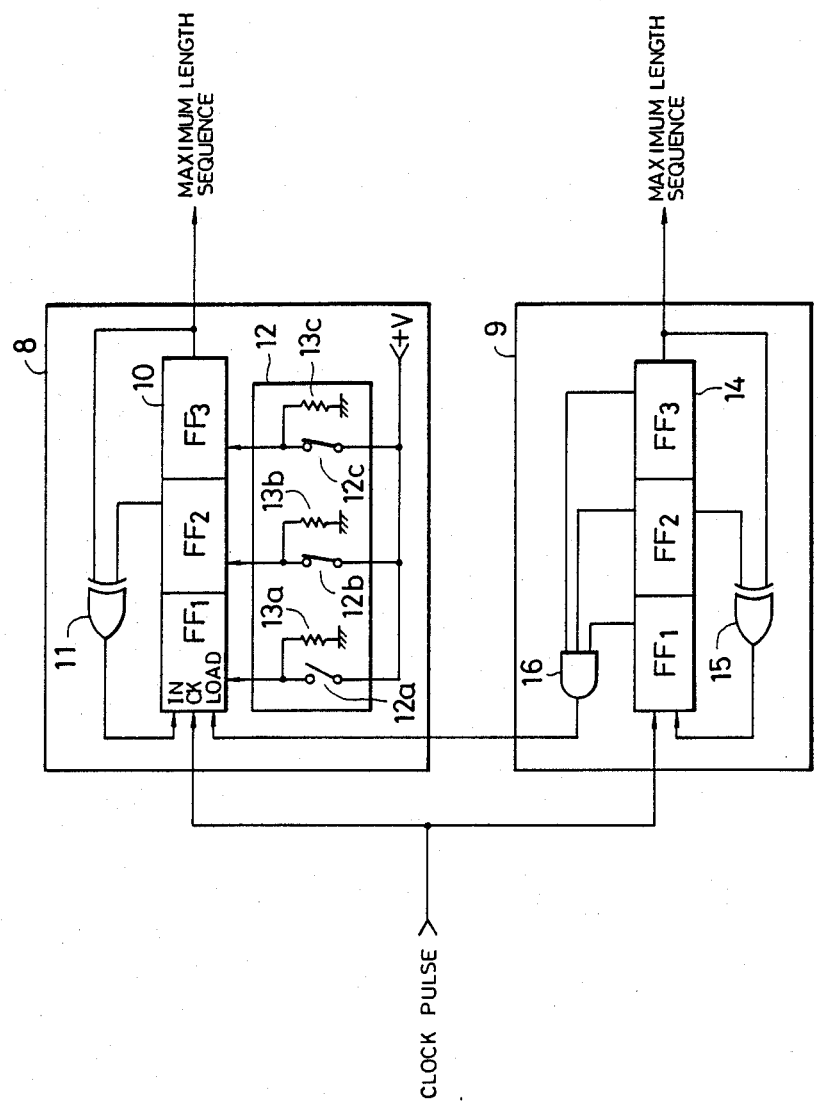
FIG. 5 is a schematic diagram of the M-sequential code generating circuits which are shown as blocks 8 and 9 in FIG. 4.

First and second M sequential code generator circuits 8, 9 are detailed in FIG. 5. The first M sequential code generator circuit 8 comprises a shift register 10 wherein flip flop circuits FF1-FF3 are connected in series, an exclusive OR gate 11 for feeding back the results of exclusive OR operations on the output signals of the flip flop circuits FF2, FF3 to the input of shift register 10, and a setting circuit 12. The setting circuit 12 is used to set the phase difference inherent in each slave unit (e.g., according to the address) between the M sequential code produced by first M sequential code generator circuit 8 and the M sequential code produced by second M sequential code generator circuit 9, which code patterns are the same. Setting circuit 12 comprises switches 12a-12c connected to a power supply +V and pull-down resistors 13a-13c.

With switches 12a-12c set as shown in FIG. 5, a set signal "0, 1, 1" will be produced. When a load control signal is supplied by second M sequential code generator circuit 9, each of flip flop circuits FF1–FF3 reads a signal sent from setting circuit 12 and sets shift register 10 to an initial state, whereby the M sequential code is produced as the contents thereof and is successively shifted according to the clock pulse supplied.

Like the first M sequential code generator circuit, the second M sequential code generator circuit 9 comprises a shift register 14 with flip flop circuits FF1–FF3 connected in series and an exclusive OR gate 15 for feeding back the results of exclusive OR operations on the output signals of the second and third stages of shift register 14 to the shift register input. The output signal of the exclusive OR gate 15 is successively shifted by shift register 14 every time the clock pulse is supplied, whereby there is formed an M sequential code having the same code pattern of that of the M sequential code produced by first sequential code generator circuit 8.

Second M sequential code generator circuit 9 also includes an AND gate 16 for detecting a state wherein all the output signals of flip flop circuits FF1–FF3 become "1", and the output signal of AND gate 16 is supplied to shift register 10 of first M sequential code generator circuit 8 as a load control signal. The set signal produced by the setting circuit 12 is set in the shift register 10 when shift register 14 is set at all "1", and accordingly, the difference between "1,1,1" and the set signal ("0,1,1" in this case) becomes the phase difference between the M sequential codes produced by the first and second M sequential code generator circuits 8, 9, the phase difference being set different by the setting circuit 12 on a slave unit basis.

Referring back to FIG. 4, the slave unit further comprises a sensor 17 and a modulator 18 for multiplying the M sequential code supplied by the first M sequential code generator circuit 8 by a sensor signal as a transmitting data signal supplied through an interface circuit 19 for multiplicative modulation, for converting the narrow-band sensor signal into a spread spectrum modulated signal uniformly distributed over a wide bandwidth and for producing the modulated signal. An adder 20 adds the spread spectrum modulated signal supplied by the modulator 18 to the M sequential code supplied by the second M sequential code generator circuit 9. A transmitting amplifier 21 amplifies the output signal from adder 20 supplied through a switch circuit 22 and supplies the amplified output signal to coupler 1. A correlator 23 correlates the output signal of the receiving amplifier 5 with the M sequential code produced by the second M sequential code generator circuit 9 and a synchronizing control circuit 24.

When a transmitted data signal is supplied through the interface circuit 19, the clock control circuit 7 is controlled for a fixed period of time so as to shift the phase of the pulse clock successively.

The phases of the M sequential codes produced by the first and second M sequential code generator circuits 8, 9 are successively varied on a period basis for a round at least and the correlation condition to the modulated signal supplied by receiving amplifier 5 of the correlator 23 is reproduced. Synchronizing circuit 24 stops controlling the clock control circuit 7 upon receiving the correlative output produced by the correlator 23. Accordingly, the time set in the synchronizing control circuit 24 is longer than what is allowed until the phase of the M sequential code produced by the second M sequential code generator circuit 9 is varied for at least one round.

A switch control circuit 25 supplies a switch-on signal to switch circuit 22 only when the correlative output is unobtainable during the operation of the synchronizing control circuit 24, i.e., when the M sequential code produced by the second M sequential code generator circuit 9 in any other slave unit is not sent out to the power line 103 together with the spread spectrum modulated signal. Switch circuit 22 is so arranged as to close only when the switch-on signal conforms to the sensor signal.

In the master unit shown in FIG. 6, a coupler 26, a receiving amplifier 27, a clock oscillation circuit 28, a clock control circuit 29, a correlator 30 and a synchronizing control circuit 31 are arranged the same as their corresponding elements of the slave unit shown in FIG. 4. The master unit further includes a first M sequential code generator circuit 32 for producing an M sequential code synchronously with a clock pulse supplied by clock control circuit 29. The phase of the M sequential code generated is shifted according to the set signal supplied by a phase shift control circuit 38. A second M sequential code generator circuit 33 for producing an M sequential code synchronously with the clock pulse supplied by clock pulse generator circuit 29 as in the case of first M sequential code generator circuit 32 is also supplied.

The M sequential codes produced by the first and second M sequential code generator circuits have the same code patterns as those of the M sequential codes produced by the first and second M sequential code generator circuits in each slave unit. The master unit further comprises a demodulator 34 for multiplicatively demodulating a received spread spectrum modulated signal amplified by receiving amplifier 27 using the M sequential code produced by the first M sequential code generator circuit 32 to obtain the received data signal. An interface circuit 35 supplies the received data signal obtained from the demodulator 34 to a display circuit 36 for displaying the received data. A divider 37 formed with a counter generates a pulse equivalent to the one period width of the clock pulse every time the clock pulse generated by the clock oscillation circuit 28 is divided down into M, the dividing ratio being set at more than twice as great as the maximum period length of the M sequential code produced by the first M sequential code generator circuit 32. A phase-shift control circuit 38 controls in such a manner as to shift the phase of the M sequential code produced by the first M sequential code generator circuit 32 synchronously with the generation of the output of the divider 37 and stops the phase-shift control when the receiving data signal is generated by the demodulator 34.

Figure 7:
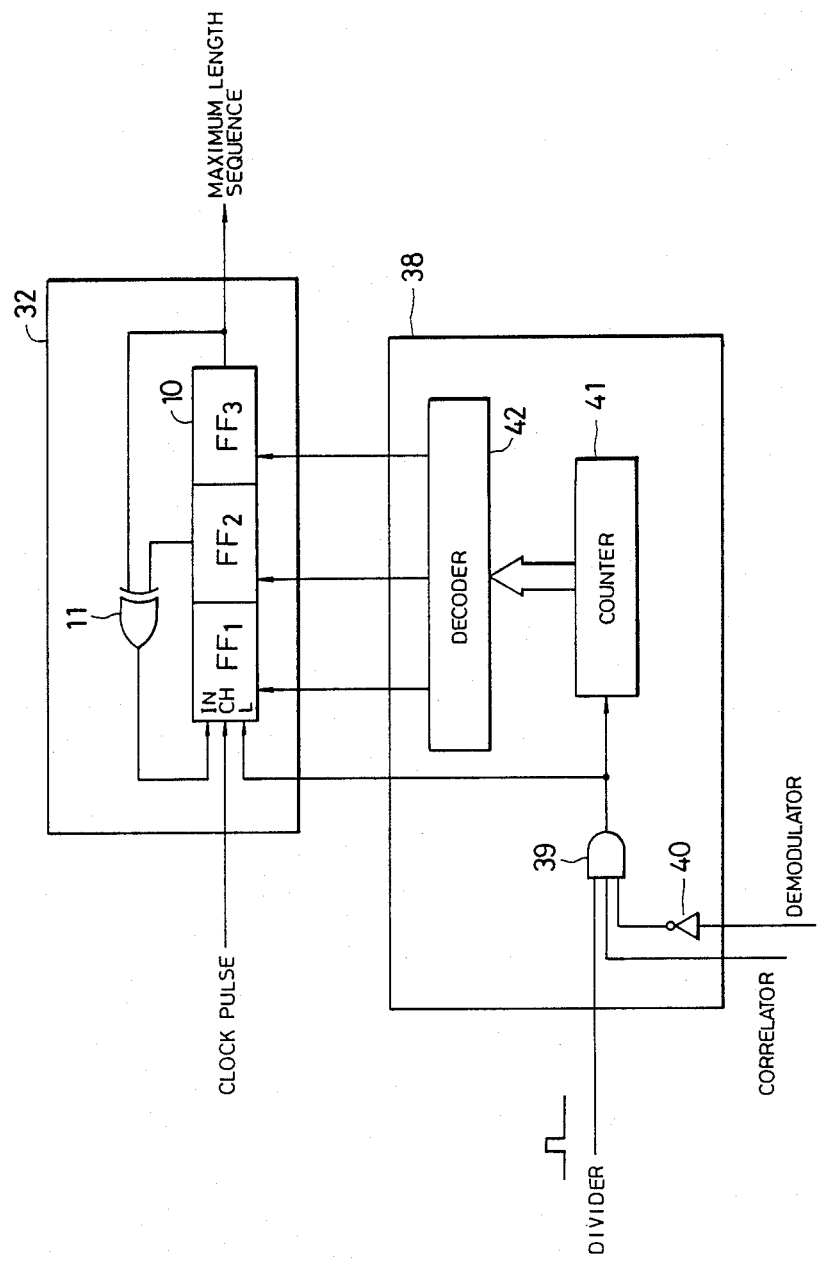
FIG. 7 is a schematic diagram of the first M sequential code generator circuit 32 and the phase-shift control circuit 38 shown as blocks in FIG. 6.

FIG. 7 is a circuit diagram of first M sequential code generator circuit 32 and the phase-shift control circuit 38 shown in FIG. 6. An AND gate 39 arranged in the phase-shift control circuit 38 seeks conformity among the pulse signals having a clock period width and supplied by the divider 37 every time the clock pulse is divided down into M, the output signal of the correlator 30 and the output signal of an invertor 40 being used for inverting the output signal of the demodulator 34. Phase-shift control circuit 38 further comprises a counter 41 for successively counting the output signal of the AND gate 39 and a decoder 42 for producing a phase-shift setting signal by decoding the counting output of the counter 41.

The shift register 10 of first M sequential code generator circuit 32 reads the phase-shift setting signal generated by the decoder 42 forming the phase-shift control circuit 38 in place of the setting circuit 12 to set its initial value with the output signal of the AND gate constituting the phase shift control circuit 38 as a load signal.

During operation clock oscillator 6 in each slave unit and the clock oscillator 28 installed in the master unit are actuated when power is supplied thereto and clock pulses having the same frequency are generated. When a clock pulse is generated by clock oscillator 6, the clock pulse is supplied to the first and second M sequential code generator circuits 8, 9 of the slave unit through the clock oscillation circuit 7 and causes the generation of the M sequential codes having the same code pattern but with phases shifted from each other according to the address of each slave unit. Shift register 10, forming the first M sequential code generator circuit, successively shifts the output signal of the exclusive OR gate 11 every time the clock pulse is supplied. Exclusive OR gate 11 has the output signal in the predetermined output stage of the shift register 10 and feeds back its exclusive OR output, thus causing the generation of the above - described M sequential code of $2n-1$, the code pattern corresponding to the state wherein the input is applied to the exclusive OR gate 11 and the maximum code length.

Shift register 14 in second M sequential code generator circuit 9 also successively shifts the output of the exclusive OR gate 16 every time the clock pulse is supplied thereto. The exclusive OR gate 16 employs the signal in the predetermined output stage of the shift register identical with the second M sequential code generator circuit 8 and feeds back the exclusive OR output. Accordingly, the code patterns of the M sequential codes produced by the first and second M sequential code generator circuits 8, 9 become identical. However, the AND gate 16 in the second M sequential code generator circuit 9 generates the load control signal when the output signal of the shift register 14 becomes all "1" and supplies the signal to the shift register 10 in the second M sequential code generator circuit 8.

Consequently, the set signal "0 1 1" supplied by the setting circuit 12 is read out and used to set the shift register 10 when the output signal of the shift register 10 becomes all "1", and the phase difference corresponding to the difference between the set signals "1 1 1" and "0 1 1" is caused between the M sequential codes generated by the first and second M sequential code generator circuits 8, 9. The phase difference is set by the switches 12a–12c constituting the setting circuit 12 at values different from one another on a slave unit basis and made to represent the address of each slave unit.

When sensor 17 produces a transmitting data signal, the transmitting signal is supplied to the modulator 18, the switch circuit 22 and the synchronizing control circuit 24 through the interface circuit 19. On receiving the transmitting signal, the synchronizing control circuit 24 successively shifts the phase of the clock pulse generated at every interval exceeding the periods of the M sequential codes produced by the first and second M sequential code generator circuits 8, 9. Accordingly, the M sequential codes produced by the first and second M sequential code generator circuits 8, 9 are different in phase to the predetermined extent, whereby the phase is successively shifted. The synchronizing control circuit 24 monitors the output signal of the correlator 23 for obtaining the correlation between the M sequential code produced by the second M sequential code generator circuit 24 and the output signal of the receiving amplifier 5 over a period until the phase of the M sequential code produced is varied for a round at least.

If any other slave unit is transmitting a spread spectrum modulated data signal to the master unit through the power line, the M sequential code produced by the second M sequential code generator circuit 9 in the slave unit involved and having the common code pattern ought to be added to the spread spectrum modulated signal produced by the modulator 18 in the adder 20 and sent out. Consequently, the output signal is obtainable from the correlator 23 during a period until the phase of the M sequential code produced by the second M sequential code generator circuit is shifted by the synchronizing control circuit 24 for a round at least. Upon receiving the output signal of the correlator 23, the synchronizing circuit 24 stops the phase-shift control and, by monitoring the output signal of the correlator 23, waits for the interruption of transmission carried on by the slave unit involved. Switch control circuit 25 is made inoperative during the waiting time and, by preventing the switch circuit 22 from being closed, reserves the transmission of the data signal to prevent the signal from being superposed on what is transmitted by any other slave unit.

When transmission from any other slave unit is terminated, the output signal of the correlator 23 is cut off and the synchronizing control circuit 24 is informed of such a state. By controlling clock control circuit 7, the synchronizing control circuit 24 successively shifts the phase of the M sequential code produced by the second M sequential code generator circuit 9 on the basis of a period greater than at least one period of the code. In case no output signal is supplied by the correlator 23 during the period until the phase is shifted for a round at least, the synchronizing control circuit 24 operates as if all the slave units connected to the power line 103 were irrelevant to signal transmission, i.e., the power line is devoid of data signals and supplies the signal to the switch control circuit 25. On receiving a signal indicating "vacancy" on the power line from the synchronizing control circuit 24, the switch control circuit 25 confirms that no signal is sent out of the correlator 23 and supplies the switch - on signal to the switch circuit 22.

Modulator 18 subjects the transmitting data signal supplied through the interface circuit 19 to multiplicative modulation by means of the M sequential code supplied by the first M sequential code generator 8 and supplies the modulated signal to the adder 20 as a spread spectrum modulated signal uniformly distributed in a wide band area. The adder 20 adds the M sequential code produced by the second M sequential code generator circuit 9 to the spread spectrum modulated signal and supplies the signal thus combined to the switch circuit 22. Since the switch circuit 22 is in the closed state because of the conformity between the transmitting data signal supplied by the interface circuit 19 and the switch - on signal supplied by the switch control circuit 25, the output signal of the adder 20 is supplied to the transmitting amplifier 21 through the switch circuit 22, and the amplified signal is supplied to the coupler 1 through the power line 103.

In the master unit of FIG. 6, subsequently, the clock oscillator 28 is producing the clock pulse having the same frequency as that of the clock oscillator 6 in the slave unit, and the clock pulse is supplied to the first and second M sequential code generator circuits 32, 33 through the clock control circuit 29 so that the M sequential codes may be produced. The M sequential code produced by the second M sequential code generator circuit 33 is used by the correlator 30 to obtain the correlation thereof to the signal supplied by the slave unit through the coupler 26 and the receiving amplifier 27, i.e., the M sequential code added to the spread spectrum modulated signal and produced by the second M sequential code generator circuit 9. When correlation is not "recognized" by correlator 30, the synchronizing control circuit 31 controls the clock control circuit 29 so as to successively shift the phase of the clock pulse supplied to the first and second M sequential code generator circuits 32, 33 and to execute control for successively shifting the phase of the M sequential code produced on the basis of a period greater than the period generated, when any one of the slave units is transmitting a signal. Accordingly an output signal indicative of correlation is produced by the correlator 30 and supplied to the synchronizing control circuit 31 at a point of time before the phase of the second M sequential code is shifted for a round. Upon receiving the output signal of the correlator 30, the synchronizing circuit 31 judges that the M sequential code produced by the second M sequential code generator circuit 33 and put in the fixed phase at the point of time is synchronous with the M sequential code produced by the second M sequential code generator circuit 9 and stops the phase-shift operation of the clock control circuit 28 until correlator 30 indicates correlation.

Divider 37, constituted by a counter, divides down the clock pulse supplied by the clock oscillator 28 into 1/M to provide a clock pulse with a period greater than the double period of the M sequential code, so that a pulse having a width equivalent to a period of the clock pulse is supplied to the phase-shift control circuit 38. When the pulse signal is supplied by the divider 37 to the phase shift control circuit 38 shown in FIG. 7, the output signal of not only the correlator 30 but also the inverter for inverting the output signal of the demodulator 34 becomes "H" and is therefore supplied to the counter 41 through the AND gate 39. In consequence, counter 41 successively counts the pulse signal supplied by the divider 37 and supplies the counting output to the decoder 42. The decoder 42 decodes the counting output of the counter 41 and supplies the setting signal for designating the phase shifting quantity to the inputs of the flip flop circuits FF1–FF3 of the register 10 forming the first M sequential code generator circuit 32. Since the shift register 10 uses the output signal of the AND gate 39 in the phase-shift control circuit 38 as a load control signal, it produces the M sequential code synchronous with the clock pulse while reading out the set signal generated by the decoder 42 and employing the signal as an initial value every time the pulse signal is supplied by the divider 37. As a result, the set signal generated by the decoder 42 successively varies with the count of the counter 41 and thus causes the phase of the M sequential code produced by the first M sequential code generator circuit 32 to be successively shifted according to the pulse generated by the divider 37. The M sequential code produced by the first M sequential code generator circuit 32 is multiplied by the received spread spectrum modulated signal supplied by the receiving amplifier 27 and demodulated in the demodulator 34, whereby a receiving signal in the form of a demodulated signal is produced by the demodulator 34 when the M sequential code produced by the first M sequential code generator circuit 32 conforms in phase to the M sequential code used in the preparation of the receiving spread spectrum modulated signal. The received signal is supplied to the inverter 40 of the phase-shift control circuit 38 and thus the output signal becomes "L", causing the AND gate 39 to close and check the reception of the pulse from the divider 37. As a result, the supply of the load control signal to the shift register 10 in the first M sequential code generator circuit 32 is suspended, and the phase of the M sequential code generated is fixed, whereby the demodulation of the receiving spread spectrum modulated signal is continued.

The received signal produced by the demodulator 34 is supplied to the display circuit 36 through the interface circuit 35, and the contents of the receiving signal are thus displayed. On receiving the set signal produced by the phase-shift control circuit 38 through the interface circuit 36, the display circuit 35 and the display circuit 36 determines the phase difference between the M sequential codes produced by the first and second M sequential code generator circuits 32, 33, discriminates the transmitting slave unit from the others and displays the slave unit involved. When the transmitting operation of the slave unit is stopped because of the recovery of the sensor 17 and the termination of the signal transmitting operation accompanied by the operation of a timer, the output signals of the correlator 30 and the demodulator 34 are interrupted, and the synchronizing control circuit 31 controls the clock control circuit 29 so as to successively shift the phase of the M sequential code produced by the second M sequential code generator circuit 33 and execute control for obtaining the correlation thereof to the signal derived from any other slave unit, i.e., retrieving the subsequent receiving spread spectrum modulated signal. Since the output signal of correlator 30 is interrupted, the AND gate 39 in the phase shift control circuit 38 is closed, and the phase-shift operation intended for the first M sequential code generator circuit 32 is also stopped.

Figure 8:
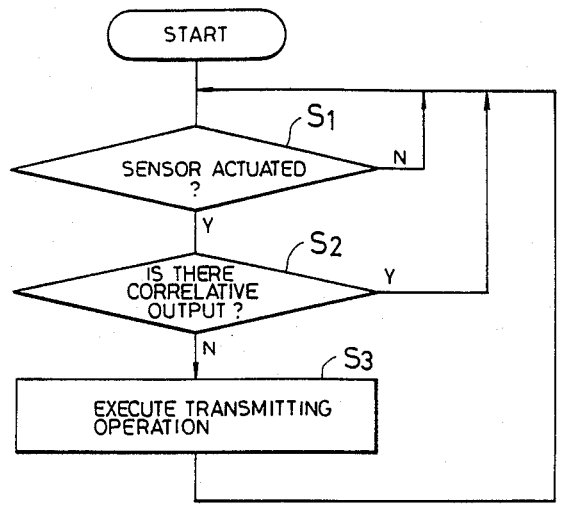
FIG. 8 and FIG. 9 are flow charts showing the operation of the master and slave units shown in FIG. 4 and FIG. 6.

FIG. 8 is a flowchart showing the operation of the above-described slave unit, wherein the operation is kept on standby in Step S1 until the sensor 17 is actuated. When the output signal of the sensor 17 is produced, the decision in Step S1 indicates YES and the operation continues to Step S2. At Step S2, the phase of the M sequential code produced by the second M sequential code generator circuit 9 is successively shifted and the presence of the correlative output of the correlator 23 is checked. If the decision is YES, it means that some other slave unit is transmitting a signal and control returns to Step S1 to make the candidate slave unit reserve signal transmission (not transmit) so that transmitting signals may be prevented from being superimposed on each other. When the decision at Step S2 is NO, the operation continues to Step S3 on the assumption that all slave units have completed signal transmission, whereby the sensor signal is subjected to spread spectrum modulation as transmitting data before being supplied to the master unit through the power line. Operation then returns to Step S1 repeatedly.

Figure 9:
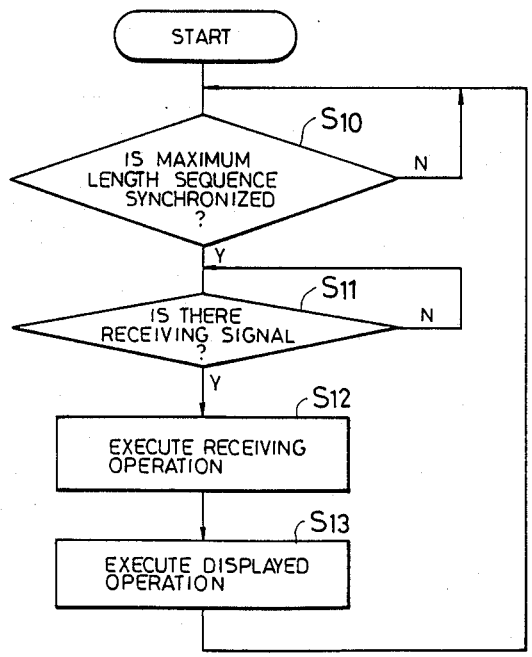

FIG. 9 is a flowchart showing the operation of the master unit, wherein the phase of the M sequential code produced by the second M sequential code generator circuit 33 is successively shifted at Step S10 to determine whether the M sequential code can be made synchronous with the M sequential code sent out of a candidate slave unit. When the decision is NO, Step S10 is repeated until synchronization is obtained. When the decision at Step S10 is YES upon receipt of the transmitting signal from the slave unit, the operation continues to Step S11, wherein it is judged whether or not the receiving signal is present, i.e., whether or not the demodulated signal is obtained from the demodulator 34 using the M sequential code resulting from the phase - shift operation applied by the phase - shift control circuit 38 to the first M sequential code generator circuit 32 and the receiving spread spectrum modulated signal as inputs. If the decision in Step 11 indicates NO, Step S11 is repeated so as to demodulate the receiving spread spectrum modulated signal again using the phase - shifted M sequential code. When the decision in Step S11 indicates YES after the repetition of the procedure, Step S12 is carried out wherein the receiving operation is implemented, and operation proceeds to Step S13 wherein the receiving data and the address of the transmitting slave unit are displayed. Then operation returns to Step S10.

Subsequently, the clock oscillators 6, 28 are formed with a PLL (Phase Lock Loop), and each generate a clock pulse synchronous with A.C. flowing through the power line 103, so that greater conformity between the phases of the clock pulse generated in each slave unit and the master unit increasingly ensures accurate communications.

Thus, each slave unit checks for the presence of a signal transmitted by any other slave unit on a power line as a transmission line when the slave unit needs to transmit a data signal, reserves transmitting (does not transmit) if there is already a spread spectrum modulated data signal on the power line and transmits a spread spectrum modulated data signal in the absence any other data signal on the line. In consequence, a plurality of slaves each capable of simultaneously transmitting a data signal are prevented from "colliding" even though the power line is "shared" by all of them. Signals are prevented from being superposed to ensure the centralized monitoring of the plurality of slave units by means of one master unit.

Figure 1:
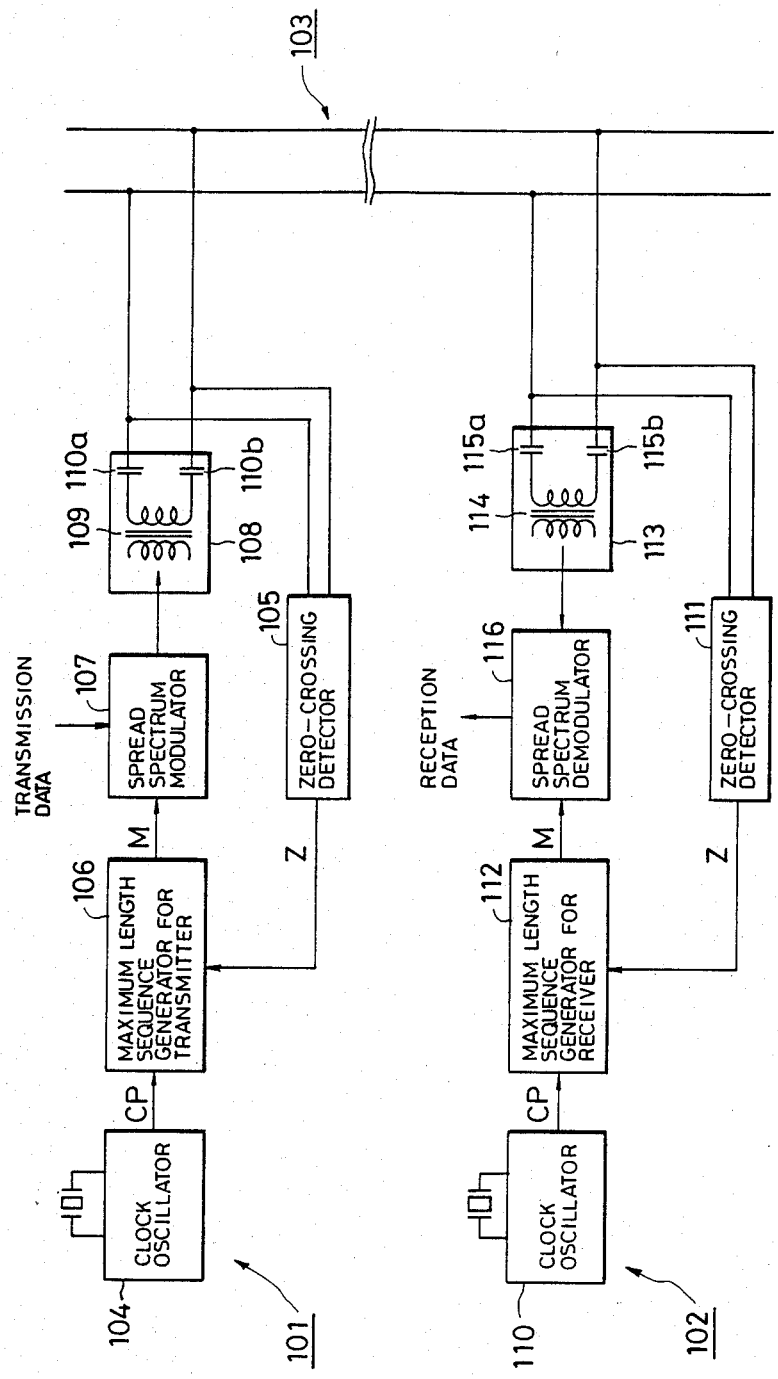
FIG. 1 is a block diagram of a spectrum scattering power line carrier frequency communication system.
Figure 2:
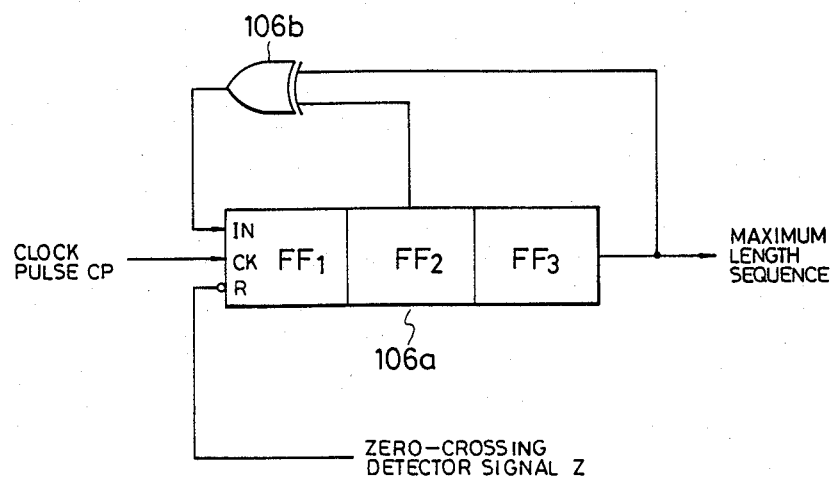
FIG. 2 is a circuit diagram of the transmitter and receiver M-series code generators shown in FIG. 1.
Figure 3:
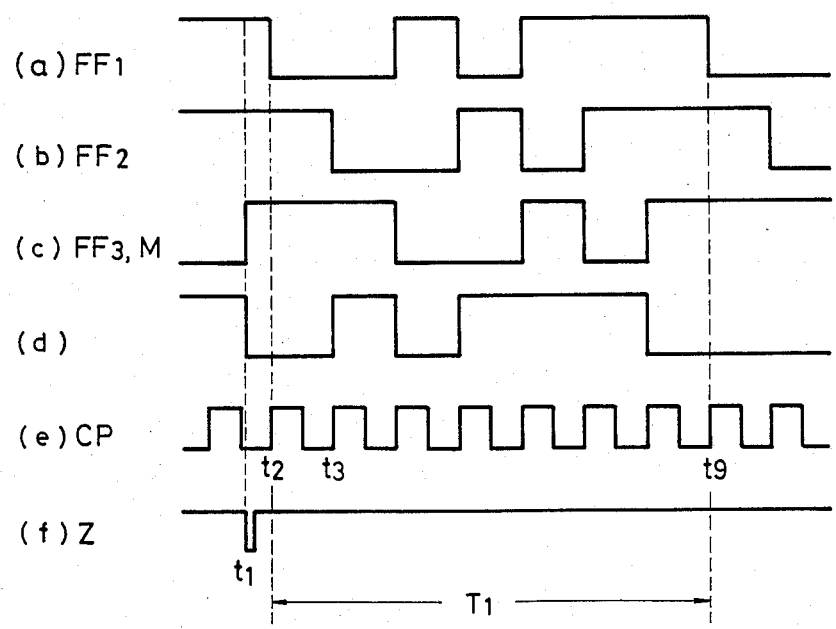
FIG. 3 shows various operational waveforms (a) to (f) at various portions for explaining the operations of the circuit shown in FIG. 2.
Figure 10:
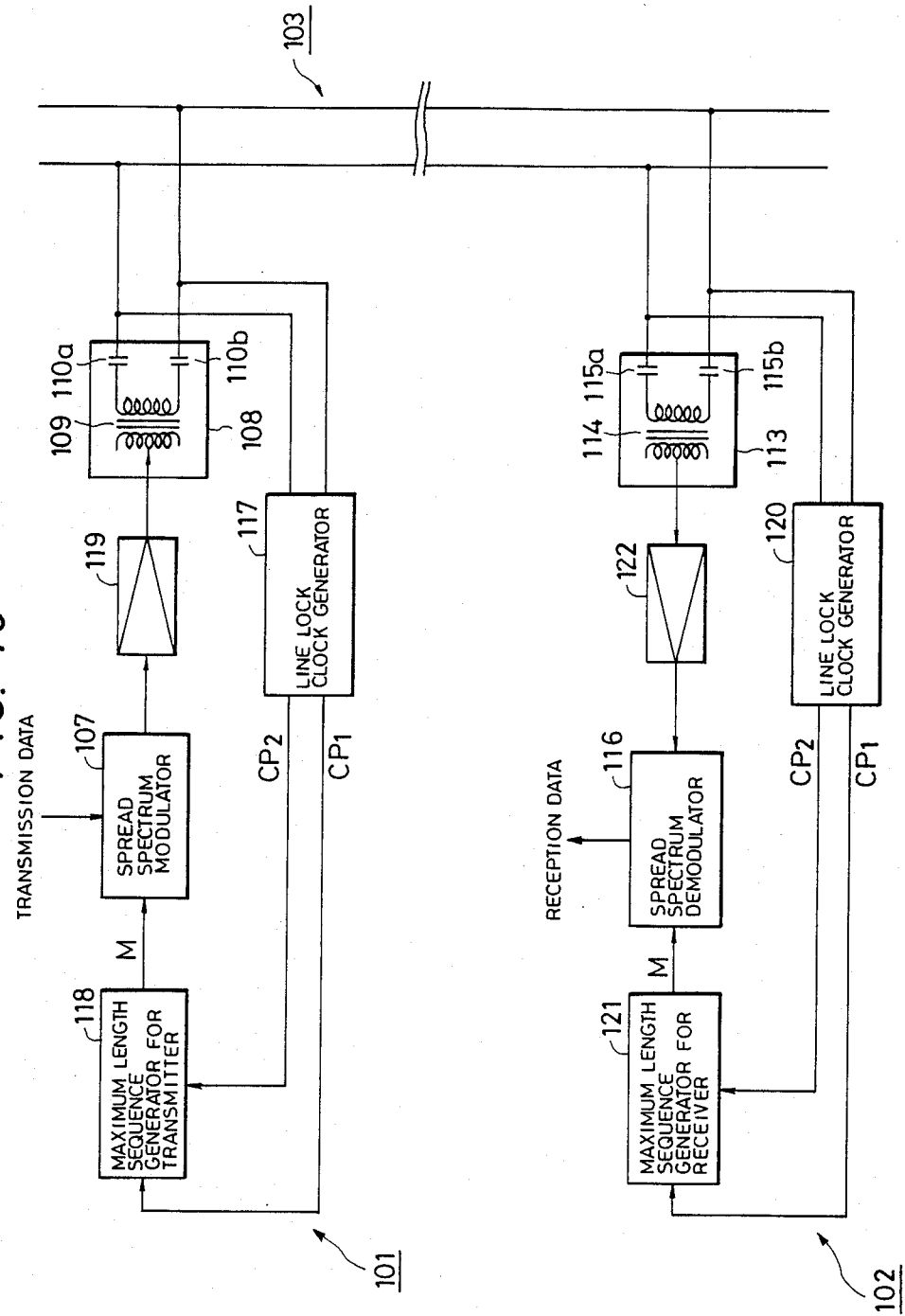
FIG. 10 is a block diagram of a line lock communication arrangement for power line communication according to the invention.

FIG. 10 is a block diagram of a line lock communication arrangement for a spread spectrum power line carrier frequency communication system according to the present invention. Elements that are like or similar to corresponding elements shown in FIG. 1 are not further described. A line lock clock generator 117 generates a first clock pulse signal CP1 and a second clock pulse signal CP2, the first clock pulse signal CP1 being synchronized with an A.C. supply supplied through power line 103 and having a frequency (K/2×2N) times as high as that of the A.C. supply, and second clock pulse signal CP2 being synchronized with the A.C. supply and having a frequency 2N times as high as that of the A.C. supply, where N represents the maximum period length of M-series code used and K represents an arbitrary integer.

An M-series code generator 118 generates an M-series code corresponding to a basic clock including first clock pulse signal CP1 generated by line lock generator 117. A transmitter amplifier 119 amplifies a spread spectrum modulated signal generated by a spread spectrum modulator 107 and supplies an amplified signal to a coupler 108 having transformer 109 and capacitors 110a and 110b. A line lock clock generator 120 and a M-series code generator 121 also are provided in a receiver 102. These generators have the same construction as that of line lock generator 117 and M-series code generator 118 for the transmitter provided in 101. A receiver amplifier 122 for amplifying a modulated signal from a spread spectrum demodulator 116 supplies the amplified signal to a coupler 113 having transformer 114 and capacitors 115(a) and 115(b).

Figure 11:
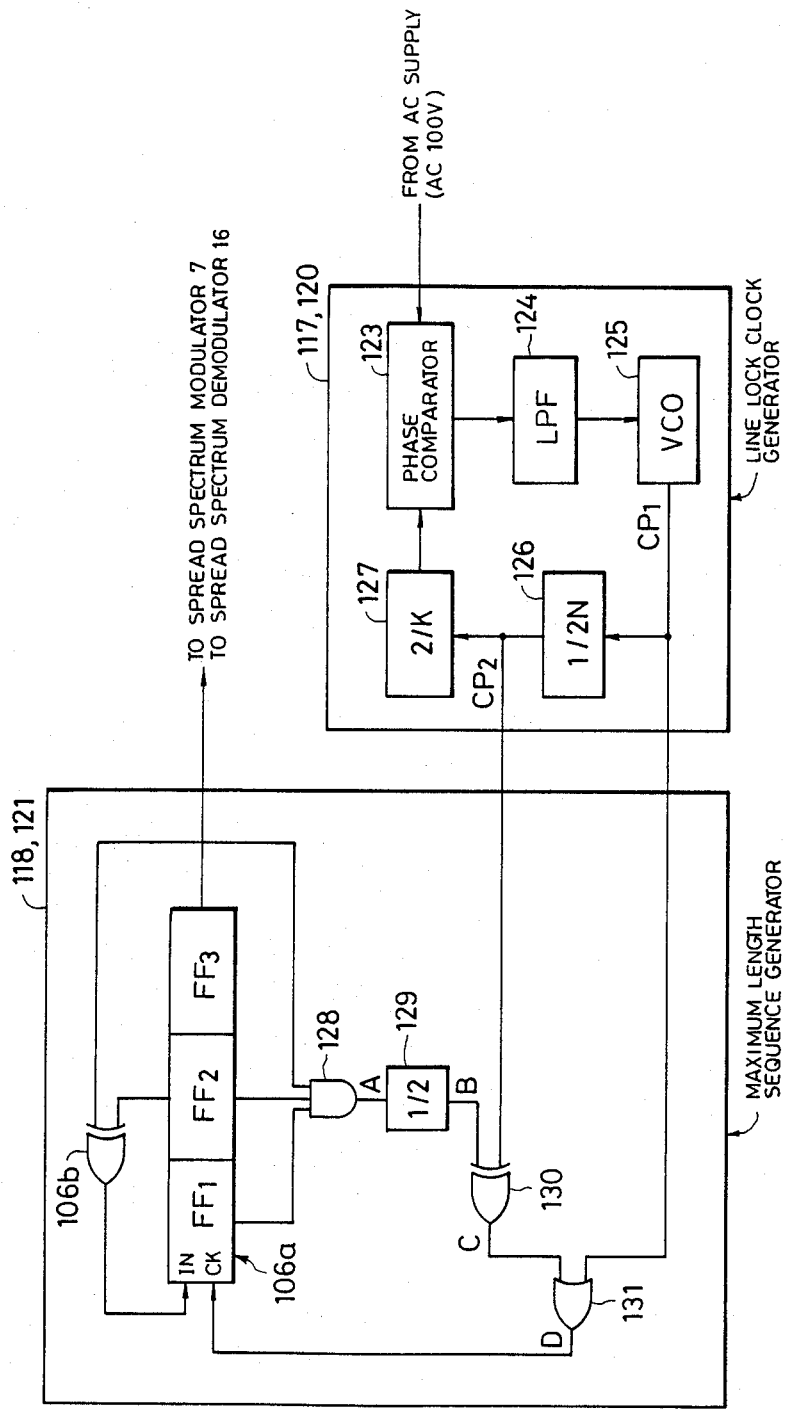
FIG. 11 is a schematic diagram of the line lock clock generator and the transmitter M-series code generator shown as blocks in FIG. 10.

FIG. 11 is a circuit diagram showing an embodiment of line lock generator 117 and line lock generator 120 and M-series code generator 118 and M-series code generator 121 for a transmitter and receiver, respectively, such as those shown in FIG. 10. A phase comparator 123 compares the phases of the A.C. supply (A.C. 100 V) supplied through power line 103 and an output signal of a frequency divider 127 which will be described later and generates a signal at a level corresponding to the difference of phase. A low-pass filter 124 smooths the output of phase comparator 123. A voltage controlled variable frequency oscillator 125 (hereinafter abbreviated to "VCO") receives the output of low pass filter 124 as a control input thereto and generates first clock pulse signal CP1. A frequency divider 126 divides first clock pulse signal CP1 so as to generate second clock pulse signal CP2 having a frequency $\frac{1}{2}$N times as high as that of first clock pulse signal CP1, where N is the maximum period length of the M-series codes generated by M-series code generator 118 and M-series code generator 121 for transmitter and receiver, respectively. A frequency divider 127 divides second clock pulse signal CP2 generated by frequency divider 126 so as to supply phase comparator 123 with a pulse having a frequency 2/K times as high as that of second clock pulse signal CP2, (where K is an integer). Thus phase comparator 123, low pass filter 124, VCO 125, frequency divider 126 and frequency divider 127 make up a phase lock loop (PLL) circuit so as to generate first clock pulse signal CP1 and second clock pulse signal CP2, first clock pulse signal CP1 being synchronized with the A.C. supply and having a frequency (N×K) times as high as that of the A.C. supply and having a frequency 2N times as high as that of the A.C. supply.

Next, M-series code generator 118 and M-series code generator 121, for transmitter and receiver respectively, generate M-series codes having a maximum code length of 2n−1 based on the use of a three-stage shift register 106a having flip-flop circuits FF1 to FF3 connected in series and an exclusive OR gate 106b for exclusively ORing the respective output signals of the flip-flop circuits FF2 and FF3 to feed back the ORed signal to the input side, where n represents the number of stages of three-stage shift register 106a. An AND gate 128 ANDs the output signals from all the stages of three-stage shift register 106a. A frequency divider 129 divides the frequency of the output of the AND gate into a frequency $\frac{1}{2}$ times as high as the former. An exclusive OR gate 130 detects disagreement between the output signal of frequency divider 129 and second clock pulse signal CP2. An OR gate 131 receives the output signal of exclusive OR gate 130 and first clock pulse signal CP1 as input signals thereto, and produces an output signal applied to a clock input terminal CK of three-stage shift register 106a. AND gate 128, frequency divider 129, exclusive OR gate 130 and OR gate 131 together synchronize the M-series codes generated with the A.C. supply.

When transmitter 101 and receiver 102 are energized, line lock generator 117 and line lock generator 120 generate first clock pulse signal CP1 and second clock pulse signal CP2 synchronized with the A.C. supply (A.C. 100 V) supplied through power line 103. After first clock pulse signal CP1 generated by VCO 125 is frequency-divided successively by frequency divider 126 and frequency divider 127, the resulting clock pulse is supplied to phase comparator 123. Phase comparator 123 compares the phases of the output signal of the divider 127 with that of the A.C. supply (A.C. 100 V), so as to generate a control signal having a polarity representing the direction of shift in phase and a level representing the difference in phase.

After smoothing by low pass filter 124 the control signal from phase comparator 123 is applied to the control signal input terminal of VCO 125 so as to be controlled to be made small. By repetition of such controlling, i.e., by performing phase lock loop (PLL) control, the phase of first clock pulse signal CP1, shown in FIG. 12(b), generated by VCO 125, is locked in the phase of the A.C. supply (A.C. 100 V) shown in FIG. 12(a). Because frequency divider 126 and frequency divider 127 are provided in the phase lock loop, first clock pulse signal CP1 has a frequency NK times as high as that of the A.C. supply, where NK represents the product of the respective divisors of frequency divider 126 and frequency divider 127. The second clock pulse signal CP2 having a frequency $\frac{1}{2}$N times as high as that of first clock pulse signal CP1 is generated from frequency divider 126 as shown in FIG. 12(f). Because second clock pulse signal CP2 is formed on the basis of first clock pulse signal CP1, second clock pulse signal CP2 also is synchronized with the A.C. supply (A.C. 100 V). At the same time, because the divisor of frequency divider 126 is 2N, second clock pulse signal CP2 forms a signal which is inverted between "H" and "L" alternately every period that accords with one period length of the M-series codes used in this system. In short, second clock pulse signal CP2 forms a signal which is synchronized, as shown in FIG. 12(f), with the A.C. supply (A.C. 100 V) shown in FIG. 12(a) and which has a frequency twice as high as that of the A.C. supply.

The first clock pulse signal CP1 and second clock pulse signal CP2 generated from line lock generator 117 are supplied to M-series code generator 118. Because first clock pulse signal CP1 is supplied to the clock input terminal CK of three-stage shift register 106a through OR gate 131, three-stage shift register 106a shifts the output signal of exclusive OR gate 106b successively. The output signals of the respective flip-flop circuits FF1 to FF3 are as shown in the waveforms (c) to (e) of FIG. 12. The output of three-stage shift register 106a, i.e., the output of the flip-flop circuit FF3, is an M-series code signal having a pattern determined in accordance with the input condition of exclusive OR gate 106b.

Figure 12:
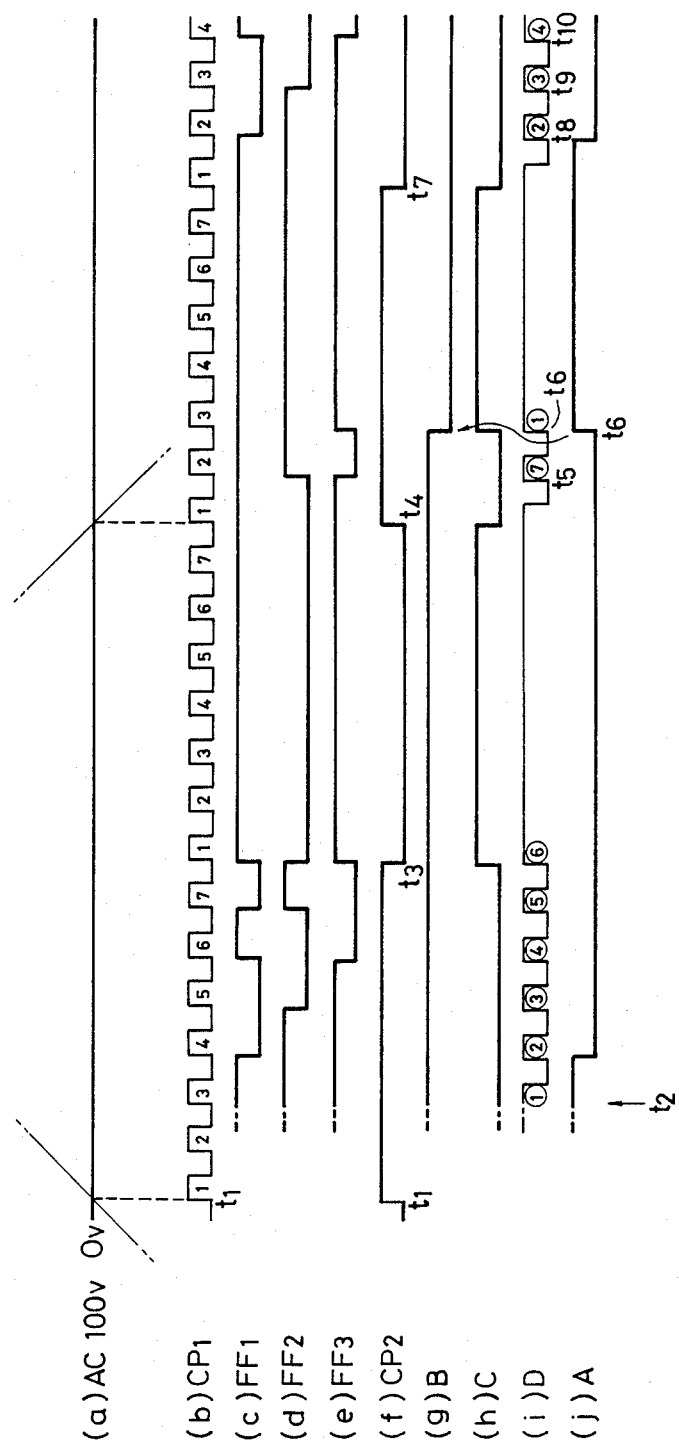
FIG. 12 shows various operational waveforms (a) to (j) explaining the operation of the arrangement shown in FIG. 11.

At initialization or reset mode upon turning-on of the power supply, for example, when three-stage shift register 106a is cleared at the point in time t2 shown in FIG. 12, all the output signals of the flip-flop circuits FF1 to FF3 are set to "1" as shown in the waveforms (c) to (e) in FIG. 12. Whenever all the output signals of the flip-flop circuits FF1 to FF3 become "1", the output signal A of AND gate 128 becomes "H" as shown in FIG. 12(j). The output signal A is frequency-divided by two in frequency divider 129, and then the resulting output signal B is supplied to exclusive OR gate 130. Accordingly, the output signal B from frequency divider 129 becomes a signal inverted between "H" and "L" alternately at every period of M-series codes in the normal state. The output signal B is compared with second clock pulse signal CP2 by exclusive OR gate 130. If they are the same, the generated M-series code is synchronous with the A.C. supply (A.C. 100 V). However, when second clock pulse signal CP2 is inverted from "H" to "L" at the point in time t3, the output signal of exclusive OR gate 130 becomes "H" as shown in FIG. 12(h) because the output signal B of frequency divider 129 does not accord with second clock pulse signal CP2. At this time, when the output signal C turns into "H" as shown in FIG. 12(i), first clock pulse signal CP1 is supplied to OR gate 131. Because the signal C of FIG. 12(H) generated from exclusive OR gate 130 is "H" in a period of discord between the output signal B of frequency divider 129 showing the period of M-series code actually generated and second clock pulse signal CP2 showing the period of M-series code synchronized with the A.C. supply, the "H" part of the signal C fixes first clock pulse signal CP1 passing through OR gate 131 at the state of "H" to thereby cut the clock pulse. Accordingly, the clock pulse D shown by (1)–(6) in FIG. 12(i) is stored in three-stage shift register 106a as it is supplied. Next, when second clock pulse signal CP2 is inverted into "H" at the point in time t4, output signal C of exclusive OR gate 130 turns becomes "L" as shown in FIG. 12(h) because the output signal B of frequency divider 129 shown in FIG. 12(g) accords with first clock pulse signal CP1 shown in FIG. 12(f). As a result, first clock pulse signal CP1 is supplied again to three-stage shift register 106a, as the clock pulse D shown in FIG. 12(i), from OR gate 131. When the clock pulse D shown by (1) of FIG. 12(i) rises up at the point in time t6 after the clock pulse D shown by (7) of FIG. 12(i) has been generated at the point in time t5, all the output signals of the respective flip-flop circuits FFf1 to FF3 become "H" as shown in the waveforms (c) to (e) in FIG. 12, so that the output signal A of AND gate 128 becomes "H" at the point in time t6 as shown in FIG. 12(j). Because the inversion into "H" of the output signal A at this time is the second occurrence from the point in time t2, the output signal B of frequency divider 129 is accordingly inverted to "L". When the output signal B becomes "L", the output signal C of exclusive OR gate 130 becomes "H" because of the discord between the output signal B and second clock pulse signal CP2 so that supply of the clock pulse D to three-stage shift register 106a is stopped.

Next, when second clock pulse signal CP2 is inverted to "L" at the point in time t7, the output signal C of exclusive OR gate 130 is accordingly inverted into "L", so that the clock pulse D is generated successively as shown by (2), (3), (4), etc., of FIG. 12(i) at the points in time t8, t9, t10, etc., and is supplied to three-stage shift register 106a. After the point in time t8, the number (2), (3), (4), etc., of the clock pulse D shown in FIG. 12(i), which is given by counting the clock pulse D supplied to three-stage shift register 106a at every maximum code length of M-series code from the point in time t2, accords with the number 2, 3, 4 etc. of first clock pulse signal CP1 shown in FIG. 12(b), which is given by counting first clock pulse signal CP1 generated in synchronism with the A.C. supply (A.C. 100 V) at every maximum code length of M-series code from the point in time when the A.C. supply is zero. In short, the clock pulse D supplied to three-stage shift register 106a is thinned out as if the output signal B of the frequency divider 29 inverted between "H" and "L" alternately at every period of M-series code generated from the shift register 6a is synchronized with second clock pulse signal CP2 (inverted between "H" and "L" alternately at every period) for representing the period in the case where M-series codes are generated in synchronism with the A.C. supply (A.C. 100 V). When M-series codes generated from the shift register 106a are once synchronized with the A.C. supply (A.C. 100 V), this condition is locked, and thereafter line lock generator 117 keeps on generating first clock pulse signal CP1 and second clock pulse signal CP2 perfectly synchronized with the A.C. supply (A.C. 100 V). Even if the phase of the A.C. supply was more or less changed for some reason, the generated M-series codes can be always synchronized with the A.C. supply. This operation can occur instantly upon turning on the power supply.

The M-series codes generated from M-series code generator 118 and synchronized with the A.C. supply are subject to product-modulation with transmission data through the spread spectrum modulator so that narrow-band data are produced as a modulated signal uniformly spectrum-spread over a wide band. The modulated signal is amplified by transmitter amplifier 119 and then transmitted onto power line 103 via coupler 108.

The line lock generator 120 and M-series code generator 121 in receiver 102 have the same construction as line lock generator 117 and M-series code generator 118 in 101. In this case, similarly to the case described above about 101, first clock pulse signal CP1 and second clock pulse signal CP2 synchronized with the A.C. supply are generated instantly from the point in time when the power source is turned on, and accordingly, M-series code synchronized with the A.C. supply are generated from M-series code generator 121 for the receiver.

Coupler 113 takes the spread spectrum modulated signal supplied from transmitter 101 through the power line. The modulated signal is amplified by receiver amplifier 122 and then supplied to spread spectrum demodulator 116. The M-series code supplied from M-series code generator 121 and the modulated signal supplied from receiver amplifier 122 are subject to product-demodulation through spread spectrum demodulator 116 which in turn produces reception data.

Because each of the M-series codes generated by transmitter M-series code generator 118 and the M-series code generated by receiver M-series code generator 121 are synchronized with the common A.C. supply, the two codes are perfectly synchronized with each other. Accordingly, because spread spectrum demodulator 116 performs product demodulation onto the received modulated signal using the same M-series code as that used at the time of modulation, the reception data which is the same as the transmitted data can be securely isolated. Even if the phase of the A.C. supply is more or less changed for some reason, the generated M-series codes in transmitter 101 and receiver 102 can be always synchronized with the A.C. supply because the phases of first clock pulse signal CP1 and second clock pulse signal CP2 are changes corresponding to the change of the phase of the A.C. supply.

Thus, an M-series code and transmission data generated in the transmitter are subject to product-modulation so that the transmission data generate spread spectrum modulated signals which are supplied to a power line, and, in a receiver, the modulated signal received through the power line is subject to product-demodulation by using an M-series code which is the same as that used in the transmitter.

A line lock arrangement as described above is utilized. First and second clock pulses are generated in each of the transmitter and the receiver, the first clock pulse being synchronized in phase with an A.C. supply flowing in the power line used as a transmission line and having a frequency (K×N) times as high as that of the A.C. supply, and the second clock pulse being synchronized in phase with the A.C. supply and having a frequency K/2 times as high as that of the A.C. supply, where N represents the maximum period length of the M-series code and K represents an integer the M-series code having the first clock pulse as a basic clock thereof and having a generation period coincident with the period of "H" and "L" of the second clock pulse. The received spread spectrum modulated transmission data is reverse spread spectrum demodulated by using the respective M-series codes synchronized with the A.C. supply. Each of the respective M-series codes used in the transmitter and in the receiver is always synchronized with the A.C. supply flowing in the power line, so that the respective M-series codes always accord with each other to thereby make it possible to obtain accurate demodulation.

Each of the respective M-series codes thus is generated on a first clock pulse synchronized with the A.C. supply and a second clock pulse synchronized with the A.C. supply and shows each period of the M-series code to be generated, unlike the conventional case where the synchronization is obtained by forcing resetting. Accordingly, it is possible to prevent occurrence of problems that would otherwise occur in conventional arrangements wherein generation of the M-series codes is interrupted by the resetting during generation thereby making communication impossible. Even if there occurs a phase difference in the A.C. supply flowing in the power line between the transmitter and receiver sides for some reason, the period of the respective M-series code is changed correspondingly, so that the received modulated signal can be always demodulated accurately to thereby "read" the transmitted data.

Figure 13:
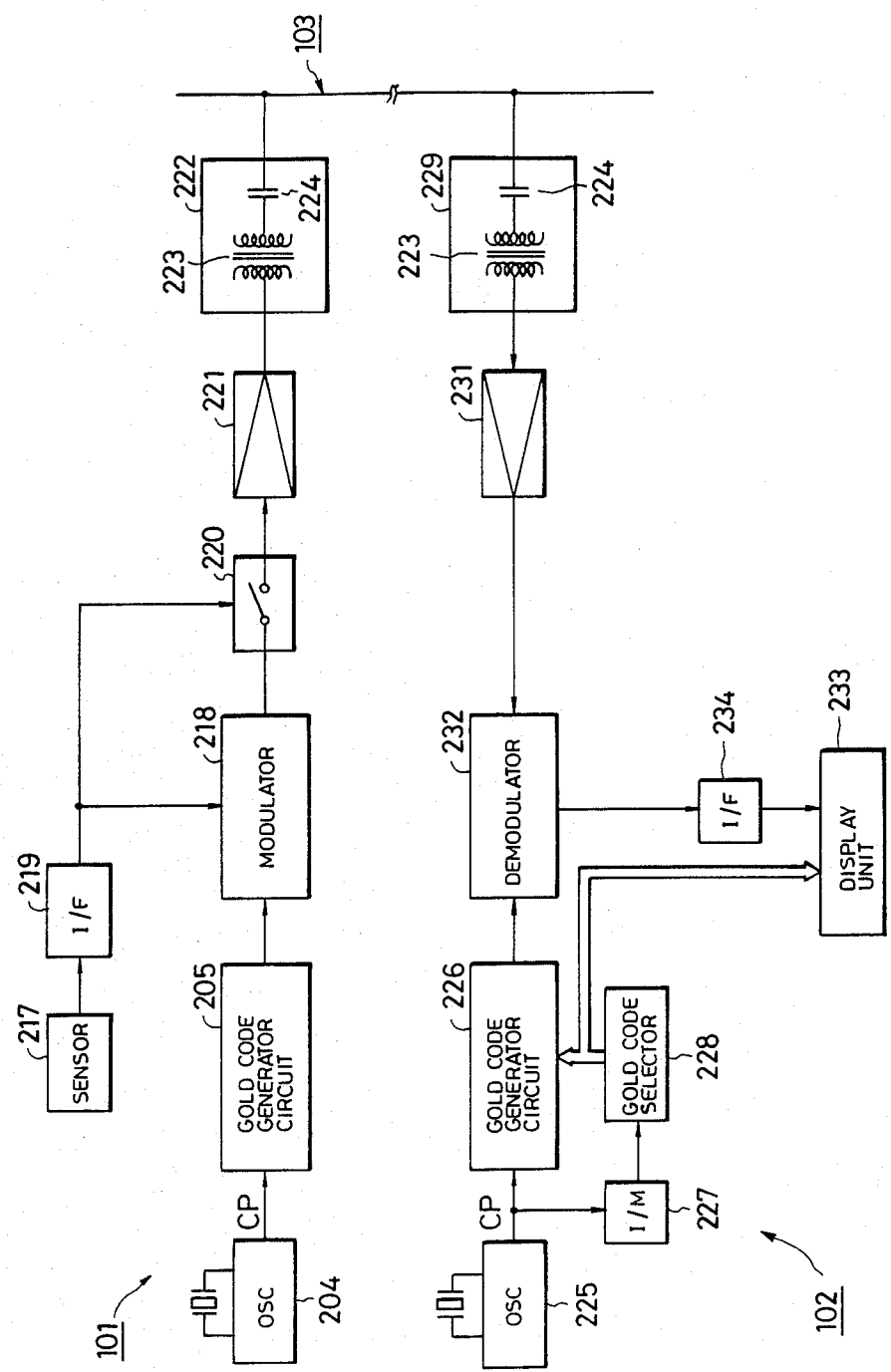
FIG. 13 is a block diagram of a spread spectrum power line carrier frequency communications arrangement using a gold code generator according to the present invention.

FIG. 13 is a block diagram of a spread spectrum power line communications arrangement according to an embodiment of the present invention. The system includes a plurality of transmitters (slave units) 101 and a receiver (master unit) 102 connected to a power line 103. The receiver 102 is used for the centralized monitoring of transmitter 101. Each transmitter 101 comprises a clock pulse generator circuit 204 for producing a high frequency clock pulse CP and a gold code generator circuit 205 for producing a gold code having a code pattern different from what is provided for another slave unit with the clock pulse CP as a basic pulse.

Figure 14:
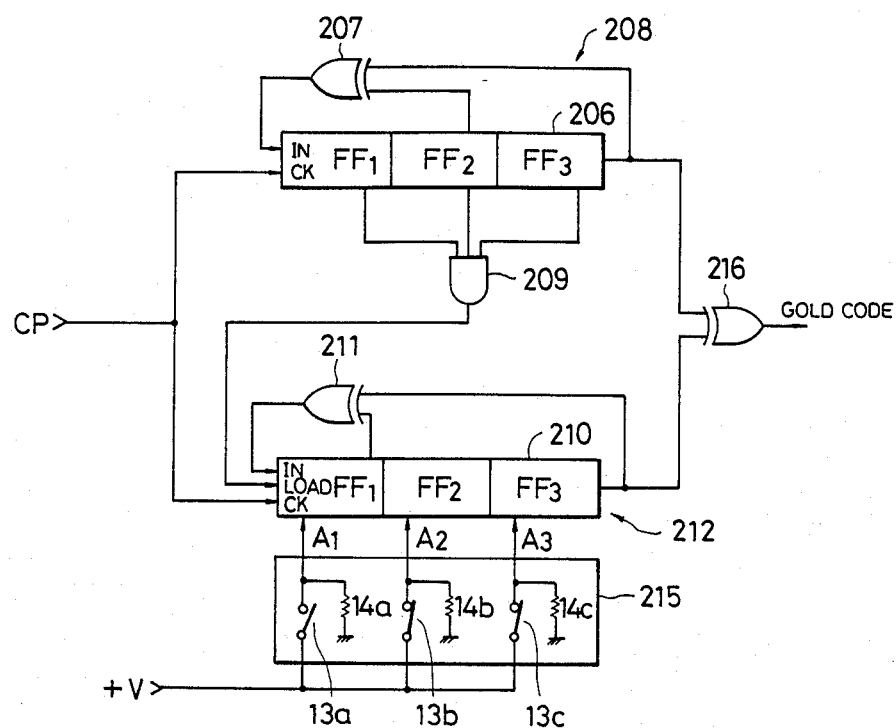
FIG. 14 is a schematic diagram of the gold code generator shown as a block in FIG. 13.

In FIG. 14, there is shown a first M sequential code generating circuit 208 comprising flip flop circuits FF1 to FF3 connected in series to constitute a shift register 206 and an exclusive OR gate 207 for obtaining the exclusive OR of the output signals of the flip flop circuits FF1, FF2, and FF3 in shift register 206 and feeding back the results obtained to the input of shift register 206. When the clock pulse CP is supplied to shift register 206, an M sequential code is produced by successively shifting the output signal of exclusive OR gate 207, the M sequential code having a maximum code length of 2n−1 (n=number of stages of the shift register) and a code pattern corresponding to the input position of exclusive OR gate 207 relative to each output stage of shift register 206. The gold code generator circuit in FIG. 14 further includes the AND gate 209 for detecting a state wherein the outputs of the flip flop circuits FF1 to FF3 constituting outputs of the flip flop circuits constituting shift register 206 become all "1" and includes an exclusive OR gate 211 forming part of second M sequential code generator circuit 212. In order to produce an M sequential code having the same maximum code length as that of first M sequential code generating circuit 208 but a different code pattern, the signal of shift register 210 is outputted at a stage different from that of shift register 206 and is supplied to exclusive OR gate 211. The shift register 210 is equipped with a load control terminal LOAD and, when the output signal of AND gate 209 is supplied to the load control terminal LOAD, the flip flop circuits FF1 to FF3 respectively read out, e.g., "0 1 1" as set signals A1 to A3 produced by a setting circuit 215 including switches 213a to 213c and pulldown resistors 214a to 214c and execute initial setting. Accordingly, if the switches 213a to 213c are set according to, e.g., the address of each slave unit, the phase difference corresponding to the address of each slave unit will be provided between the M sequential codes produced by first M sequential code generating circuit 208 and second M sequential code generator circuit 212, and the gold code having a code pattern inherent in each slave unit will be produced by exclusive OR gate 216 which obtains the exclusive OR of both M sequential codes.

Referring back to FIG. 13, a sensor 217 for detecting infrared intrusion and window damage is connected to a modulator 218, and narrow-band transmitting data is generated as a spectrum-diffusion modulated signal by subjecting the transmitting data supplied by sensor 217 through an interface circuit 219 to multiplicative modulation using the gold code supplied by gold code generator circuit 205 having a code pattern inherent in each slave unit. On receiving the transmitting data generated by interface circuit 219, a switch circuit 220 is turned on and caused to supply the spread spectrum modulated signal produced by modulator 218 to a transmitting amplifier 221. A coupler 222 including a transformer 223 is a capacitor 224 and used to supply the spread spectrum modulated signal produced by transmitting amplifier 221.

The receiver 102 includes a clock pulse generator circuit 225 for generating a clock pulse CP having the same frequency as what is generated by clock pulse generator circuit 204, a gold code generator circuit 226 for producing a gold code with the clock pulse CP as a basic clock so that the gold code allotted to each slave unit may be produced through external control, a divider 227 for dividing down the clock pulse CP into 1/M (where M is more than twice as long as the maximum code length of the gold code 228), a gold code selector for switching the gold code produced by gold code generator circuit 226 when the output signal of divider 227 is supplied, a coupler 229 including transformer 223 and capacitor 224 and used to obtain the spread spectrum modulated signal supplied by each transmitter 101 through power line 103 and supply the modulated signal to a receiving amplifier 231, a demodulator 232 for obtaining receiving data by multiplicatively demodulating the receiving spread spectrum modulated signal supplied by receiving amplifier 231 by means of the gold code supplied gold code generator circuit 226, and an address display unit 233 for displaying the receiving data and the address of a slave unit transmitting the receiving data on receiving the data supplied through an interface circuit 234 (see FIG. (7)) and the select signal supplied by a gold code selector 228. Subsequently, a description will be given of a case wherein a lamp corresponding to the slave unit transmitting the data is lighted.

Figure 15:
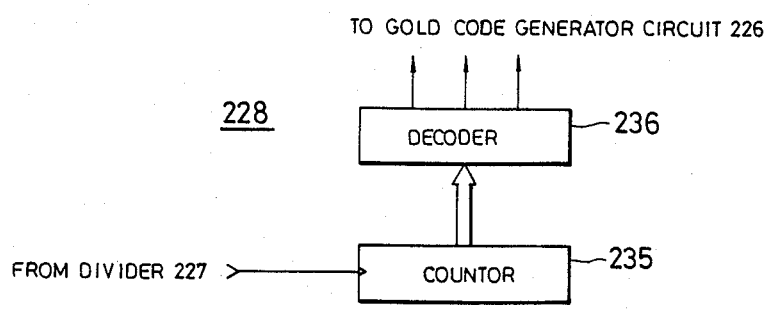
FIG. 15 is a circuit diagram of the gold code selector shown in FIG. 13.

FIG. 15 is a circuit diagram showing gold code selector 228 in detail. The gold code selector 228 includes a counter 235 for counting the output signal of divider 227 and a decoder 236 for producing a select signal by converting the output signal of a counter 235 into the gold code allotted to each slave unit. The gold code generator circuit 226 is roughly the same in construction as what is shown in FIG. 14, and the output signal of decoder 236 in place of that of the setting circuit 215 is supplied to each of the flip flop circuits FF1 FF3 constituting second M sequential code generator circuit 212.

The clock pulse generator circuit 204 in each transmitter 101 and the clock pulse generator circuit 225 installed in receiver 102 are actuated when power is supplied and produce clock pulses CP having the same frequency. When the clock pulse CP is generated by clock pulse generator circuit 204, the first M sequential code generating circuit 208 and second M sequential code generator circuit 212 in gold code generator circuit 205 shown in FIG. 14 are operated so as to produce two kinds of M sequential codes having the same code pattern and phases shifted corresponding to the address of each slave unit. The M sequential codes are multiplicatively modulated by exclusive OR gate 216 and produced as the gold code having a code pattern inherent in each slave unit. The shift register 206 forming first M sequential code generating circuit 208 successively shifts the output signal of exclusive OR gate 207 every time the clock pulse CP is supplied. In this case, exclusive OR gate 207 feeds back the exclusive OR output with the output signal of the predetermined output stage (second and third stages) of the shift register and therefore the M sequential code having the code pattern corresponding to the input condition of exclusive OR gate 207 and the above-described maximum code length of $2n-1$ is produced. When the output signals of the flip flop circuits FF1 to FF3 become all "1" and are cleared, the load signal is produced by AND gate 209 and supplied to the load control terminal LOAD of the shift register forming second M sequential code generator circuit 212. When the load signal is supplied, the setting signals A1 to A3 generated by the switches 213a to 213c constituting setting circuit 215 are input to the flip flop circuits FF1 to FF3 and shift register 210 is thus set. The switches 213a–213c of setting circuit 215 are set so that the phase shift inherent in each slave unit may be given to the shift register against the all "1" state of shift register 206 forming first M sequential code generating circuit 208.

The flip flop circuits to FF1 FF3 of shift register 210 are preset at "0 1 1" at the time of the all "1" state of shift register 206 in FIG. 14. Both shift register 206 and shift register 210 successively shift the feedback output signals of exclusive OR gate 207 and exclusive OR gate 211 every time the clock pulse CP is supplied, so that the M sequential codes having the same code pattern and phase difference inherent in the slave unit are produced by first M sequential code generating circuit 208 and second M sequential code generator circuit 212. Both M sequential codes having the phase difference therebetween are combined in exclusive OR gate 216 and the gold code having the code pattern inherent in the slave unit is generated.

Figure 16:
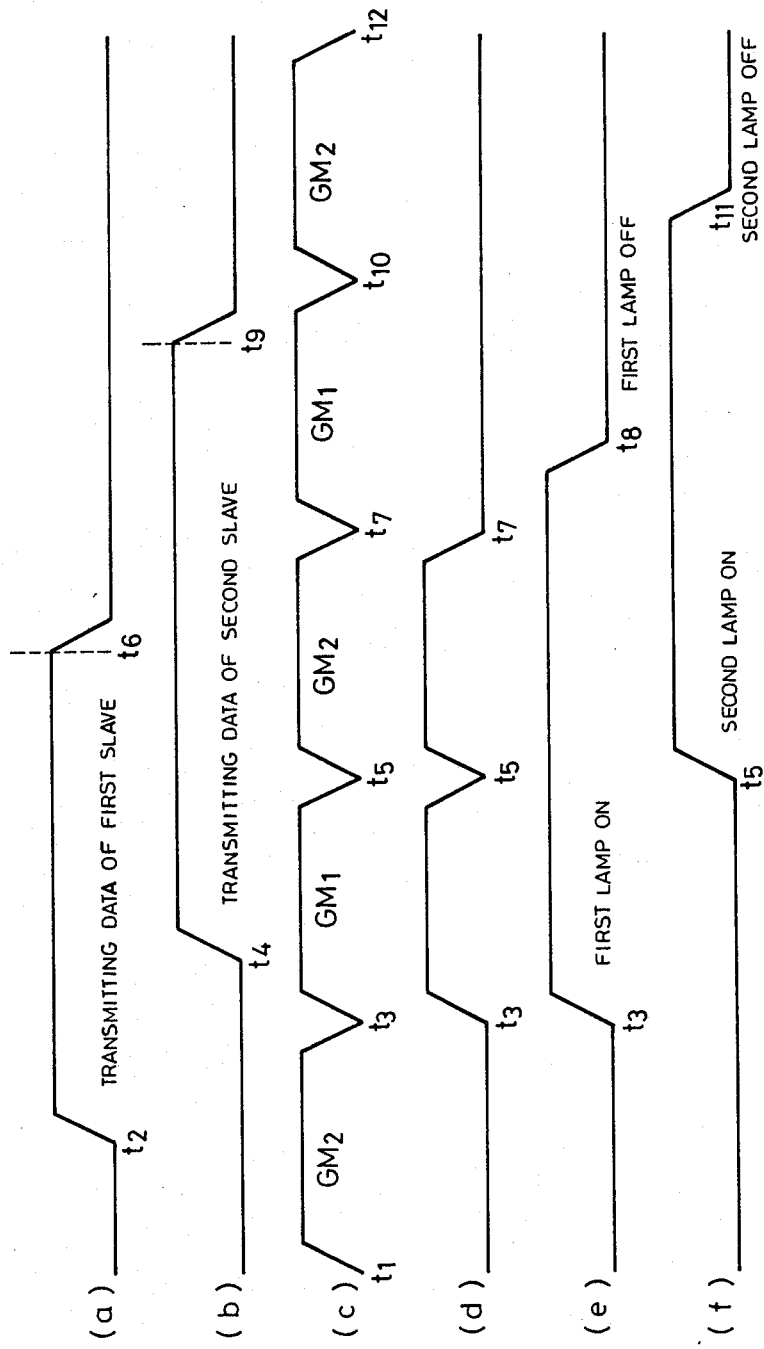
FIGS. 16(a)-(f) show waveforms illustrating the operation of the FIG. 13 system.

When the transmitting data is generated for a period t2-t6 shown in FIG. 16(a) as sensor 217 is actuated, the transmitting data is supplied to modulator 218 through interface circuit 219 and multiplicatively modulated by the gold code produced by gold code generator 205 and has the code pattern inherent in transmitter 101 before being produced as the spread spectrum modulated signal. Since the transmitting data generated by sensor 217 causes switch circuit 220 to close through interface circuit 219, the spread spectrum modulated signal generated by modulator 218 is supplied to transmitting amplifier 221 through switch circuit 220. The spread spectrum modulated signal amplified by transmitting amplifier 221 is supplied to power line 103 through coupler 222. In a second slave unit (not shown), its sensor is actuated for a period of t4–t9 in FIG. 16(b), and it is assumed that a spread spectrum modulated signal resulting from the multiplicative modulation of transmitting data by means of a gold code having a code pattern inherent in the second slave unit is sent to power line 103.

Divider 227 in receiver 102 supplies to gold code selector 228 the output signal obtained by dividing down the clock pulse CP into the value M more than twice as great as the maximum code length (2n−1) of the gold code produced by gold code generator circuit 226. The counter 235 of gold code selector 228 shown in FIG. 15 successively counts the output signal from divider 227, and the counting output is supplied to decoder 236. The decoder 236 employs the output signal of counter 235 as a slave address and outputs a set value being given to shift register 210 of second M sequential code generator circuit 212 forming gold code generator circuit 205 in the slave unit designated by the slave address, i.e., supplies "0 1 1" to e.g., the first transmitter 101 as the set signal generated by the switches 213a–213c in setting circuit 215. In consequence, the select signal equivalent to the set signals A1 to A3 intended for the slave unit corresponding to the output of the counter for counting the output of divider 227 is successively generated every time the output signal is produced in a predetermined period sufficiently longer (a period more than twice as great as than) the period wherein the gold code is produced by gold code selector 228.

The select signal thus produced is supplied to the shift register FF1–FF3 forming second M sequential code generator circuit 212 in gold code generator circuit 226 excluding setting circuit 215 shown in FIG. 14. Since the select signal equivalent to the set signals A1 to A3 of each slave unit is successively supplied every time the output signal is produced by divider 227, the select signal is read by the flip flop circuits FF1 to FF3 and used for initial setting every time the load signal is produced by AND gate 209. As a result, gold codes GM1, GM2 inherent in each slave unit (when two slave units are used) are alternately generated by gold code generator circuit 226 for combining the M sequential codes produced by first M sequential code generating circuit 208 and second M sequential code generator circuit 212 by means of exclusive OR gate 216 every time the output of divider 227 is produced as shown in FIG. 16(c).

Coupler 229 receives the spread spectrum modulated signals supplied by the various slave (transmitter) units through power line 103, and the spread spectrum modulated signal obtained by coupler 229 is amplified by receiving amplifier 231 before being supplied to demodulator 232. The demodulator 232 uses the gold code generated by gold code generator circuit 226 to multiplicatively demodulate the spread spectrum modulated signal and obtain the receiving signal. In this case, the gold code produced by gold code generator circuit 226 and having the code pattern inherent in each slave unit is successively repeatedly produced as shown in FIG. 16(c), and consequently only the transmitting data from a slave unit employing a gold code conforming to that gold code is made receivable. Although the gold code GM2 is produced for a period of t1–t3 as shown in FIG. 16(c), no receiving data is generated by demodulator 232 as shown in FIG. 16(d) because the second slave unit is transmitting no data as shown in FIG. 16(b) during the above period. The gold code GM1 is produced for a period of t3–t5 as shown in FIG. 16(c), and therefore the spread spectrum modulated signal sent out of transmitter 101 is demodulated. Since the transmitter 101 is transmitting data during the above period, the receiving data shown in FIG. 16(d) is generated by demodulator 232. The gold code identical with the gold code used in each slave unit is successively produced, and the spread spectrum modulated signal sent by each slave unit is demodulated on a time sharing basis, so that the receiving data is obtained.

However, the receiving data generated by demodulator 232 represents the transmitting data as it is, and it is impossible to check which one of the slave units is, transmitting the data on receiving the data through interface circuit 234. Accordingly, address display unit 233 judges which one of the slave units is sending the gold code from the contents of the select signal generated by gold code selector 228 at that point of time and lights the lamp corresponding to the slave unit involved. Since the receiving data produced for a period of t4–t5 shown in FIG. 16(d) represents the gold code GM1 being generated, address display unit 233 judges that the receiving data is involved in the demodulation mode of the spread spectrum modulated signal relative to transmitter 101 and displays the operation of sensor 217 by locking a first lamp indicative of the state of sensor 217 installed in transmitter 101 to an on-state at the point of time t3 shown in FIG. 16(c). Since the gold code GM2 is being produced for a period of t5–t6, the sensor installed in the second slave unit is being actuated obviously and, as shown at the point of time t5 of FIG. 16(f), the second lamp is locked to the on-state, indicating that the sensor installed in the second slave unit is in operation. Since the gold code GM1 is being produced for a period of t7–t10 as shown in FIG. 16(c), this period is appropriated for the demodulation of the modulated signal derived from transmitter 101. However, the receiving data is not generated by the demodulator as shown in FIG. 16(d) because the transmitting data is interrupted as shown in FIG. 16(a) during that period and, judging from the interruption of the receiving data, address display unit 233 displays the unoperated condition of the sensor 1 by turning off the first lamp as shown in FIG. 16(e). Since the gold code GM2 is being produced for a period of t10–t12 as shown in FIG. 16(c), this period is appropriated for the demodulation of the modulated signal received from the second slave unit. However, judging from the interruption of the transmitting data derived from the second slave unit, demodulator 232 produces no receiving data and address display unit 233 turns off the second lamp, thereby indicating the unoperated condition thereof at the point of time t11 shown in FIG. 16(f). Although the divider is operated with the dividing value M being twice as great as the maximum code length of the gold code in order to prevent the select signal from being changed at least until a period of gold code is generated in consideration of the shifted period of the gold code to be generated, the dividing value may be set equal to the maximum code length, provided that both are synchronous. As a method of acquiring the synchronization, counter 235 may be so arranged as to count the load signal generated by AND gate 209.

Figure 17:
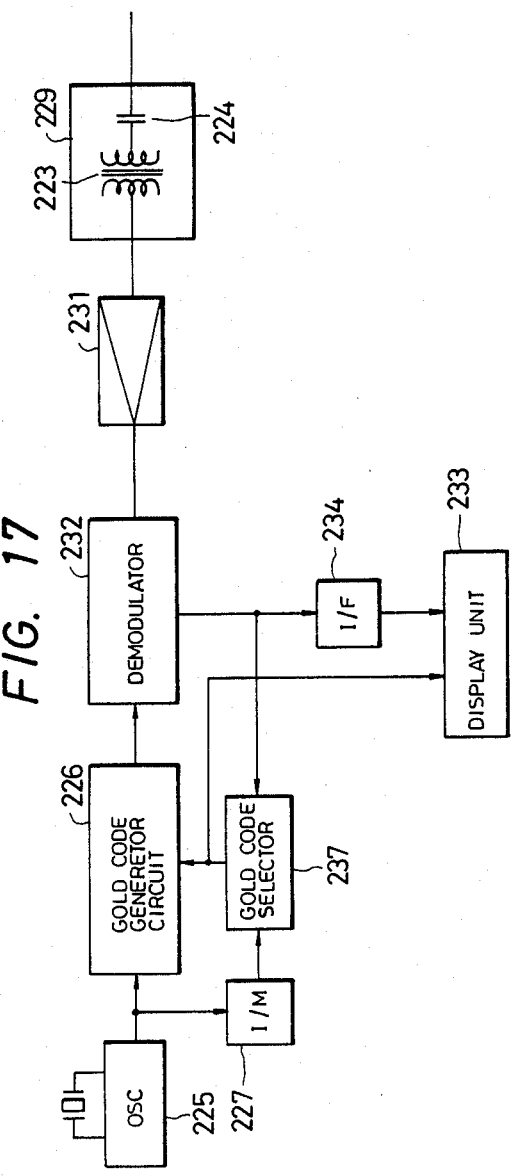
FIG. 17 is a block diagram of another gold code embodiment of a master unit according to the present invention.
Figure 18:
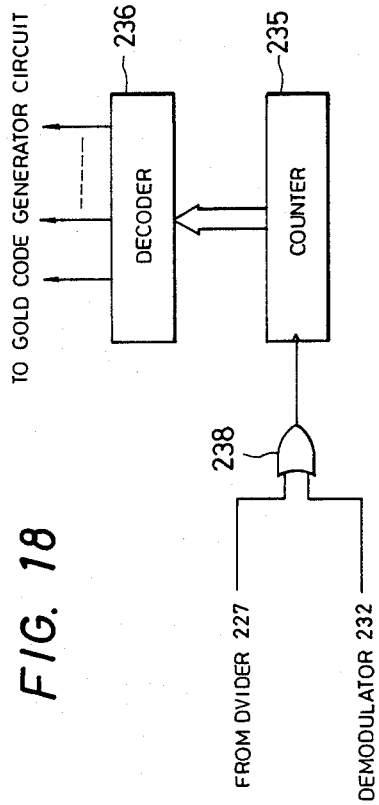
FIG. 18 is a schematic diagram of the gold code selector of FIG. 17.

FIG. 17 shows another spread spectrum power line communications arrangement according to the present invention, wherein like reference characters designate like parts of FIG. 13 as far as the master unit is concerned. The difference between FIGS. 17 and 13 includes the gold code selector so arranged as to receive the output signal of divider 227 only when no output signal of demodulator 232 exists. The gold code selector circuit 237 is, as shown in FIG. 18, equipped with an OR gate 238 for receiving the output signals of the divider 227 and demodulator 232 and supplying the output signals to counter 235.

The output of divider 227 is successively supplied to counter 235 when the receiving data is not generated by gold code generator circuit 226; therefore, the gold code generated by gold code generator circuit 226 causes the code pattern used in each slave unit to be successively generated.

The receiving data is generated by demodulator 232 and a "H" signal is supplied to OR gate 238, whose output signal is caused to remain in the "H" state, irrespective of the output signal of divider 227. Consequently, the counting operation of counter 235 is suspended and the gold code generated by gold code generator circuit 226 is fixed.

When the transmitting data has been sent out of the slave unit using the gold code and thus the transmitting operation is stopped, the receiving signal intended for the demodulator is cut off. In consequence, the output signal of OR gate 238 changes from "H" to "L" according to the output signal of divider 227, and counter 235 counts the change, thereby permitting repetition of the generation of various gold codes as aforementioned. The receiving mode intended for one and the same slave unit is maintained after all the data has been received, i.e., until the data has completely been transmitted from a given slave unit and cut off. Accordingly, the system according to the present invention is proved suitable for use in dealing with a large amount of transmitting data. Moreover, the select signal produced by gold code selector 237 is changed every time the output signal is produced by divider 227. Accordingly, the duration required to confirm a slave unit as having no transmitting data can be shortened to the extent that a period of gold code is produced. Furthermore, a signal derived from the next slave unit transmitting data will be received quicker.

Each slave unit generates a gold code inherent therein, and the gold code is used only when data necessary for transmission is produced so as to subject the transmitting data to multiplicative modulation and to supply a spread spectrum modulated signal to a power line. The master unit obtains receiving data by causing each slave unit to successively produce a predetermined gold code different from what is generated by another slave unit and by multiplicatively demodulating the spread spectrum modulated signal received through the power line so as to collectively monitor the plurality of slave units by discriminating a slave unit transmitting the data according to the correlation of the receiving data at the time demodulation to the gold code. In consequence, the master unit is readily capable of carrying out the centralized monitoring of each slave unit by successively demodulating the gold code as requirements for demodulating the receiving spread spectrum modulated signal without using any other complicated method such as successive polling applied to each slave unit.

The first and second M sequential code generator circuits for producing M sequential codes having patterns different from each other are provided with the phase difference inherent in each slave unit for allowing each slave unit to produce the predetermined individual gold code and, when the inherent gold code is generated by combining both output signals, the master unit is caused to successively generate the gold code inherent in each slave unit.

Figure 19:
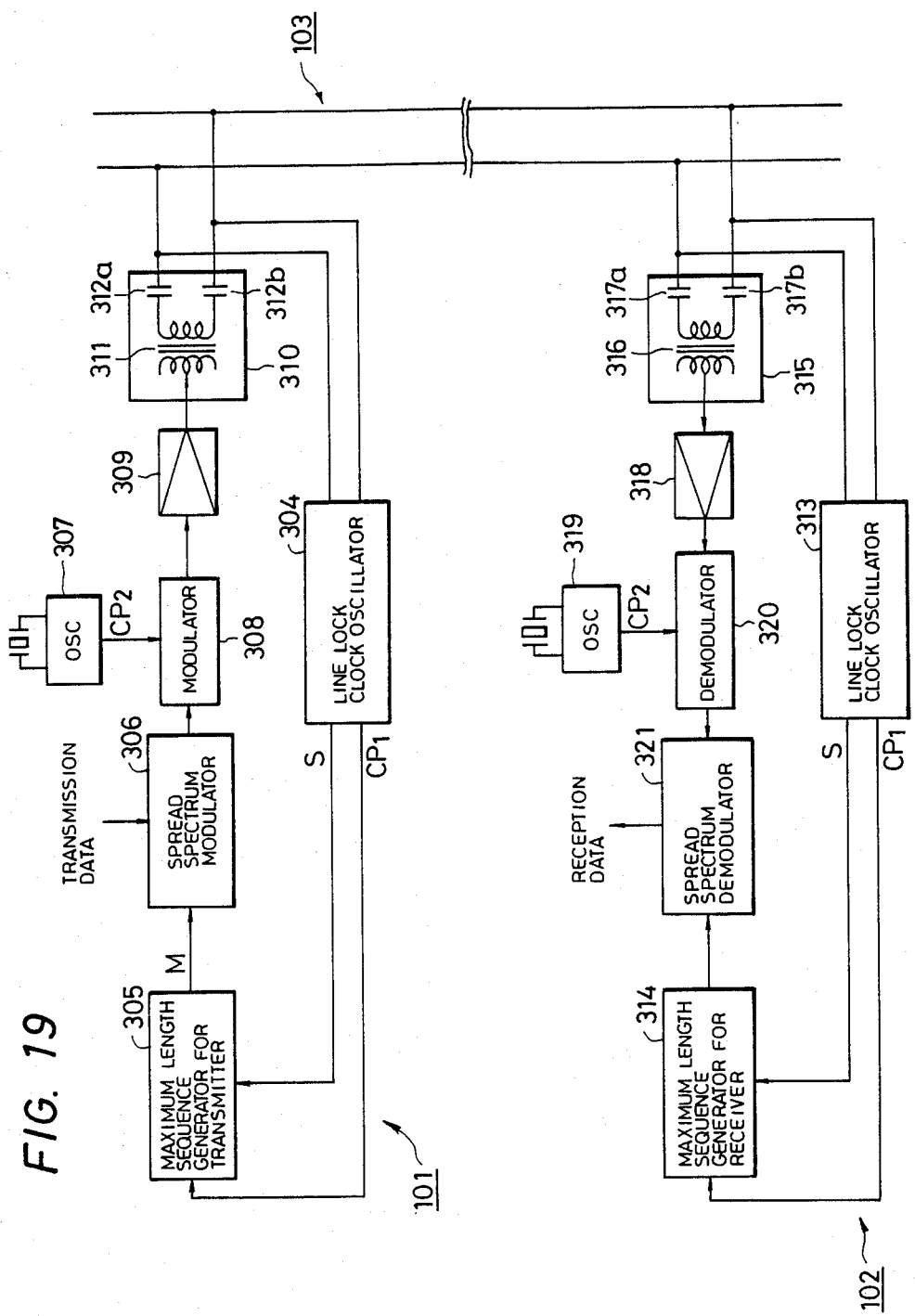
FIG. 19 is a block diagram of another embodiment of a line lock spread spectrum communication arrangement according to the invention.

FIG. 19 is a block diagram of another embodiment of the invention. A transmitter 101 and a receiver 102 are connected to each other through a power line 103. In transmitter 101, a line lock clock generator 304 generates first clock pulse signal CP1 and a synchronizing pulse S, first clock pulse signal CP1 being in synchronism with an A.C. supply connected to power line 103 and having a frequency $K/2 \times 2N$ times as high as that of the A.C. supply, and the synchronizing pulse S being in synchronism with the A.C. supply and having a frequency $2N$ times as high as that of the A.C. supply, where the maximum period length of a used M-series code and a given integer are designated by N and K respectively. A transmitter M-series code generator 305 generates an M-series code on the basis of first clock pulse signal CP1 produced from line lock clock generator 304 in synchronism with the synchronizing pulse S. A spread spectrum modulator 306 then performs product-modulation between the transmission data and the M-series code generated by transmitter M-series code generator 305 to produce a spread spectrum modulation signal in which the transmission data of a narrow band are distributed uniformly over a wide band. A clock oscillatory oscillator 307 generates second clock pulse signal CP2. A modulator 308 performing then performs product-modulation between the spread spectrum modulation signal supplied from spread spectrum modulator 306 and second clock pulse signal CP2 so as to produce the thus modulated output. A transmitter amplifier 309 amplifies the modulated output of modulator 308. A coupler 310 including a transformer 311, a capacitor 312a and a capacitor 312b supply power line 103 with an output from transmitter amplifier 309.

In receiver 102 a receiver line lock clock generator 313 has the same arrangement as that of transmitter line lock clock generator 304. A receiver M-series code generator 314 has the arrangement of transmitter M-series code generator 305 for transmitter 101. A coupler 315 including a transformer 316, and capacitors 317a and 317b remove a transmission signal supplied through power line 103. A receiver amplifier 318 amplifies an output of coupler 315. A clock oscillator 319 also generates second clock pulse signal CP2. A demodulator 320 in which an output signal from receiver amplifier 318 is subject to product-demodulation uses second clock pulse signal CP2 so as to isolate a spread spectrum modulation signal. A reverse spread spectrum demodulator 321 demodulates the modulated signal from demodulator 320 by using the M-series code produced from receiver M-series code generator 314 to produce reception data.

The line lock clock generators and M-series code generators of the FIG. 19 embodiment are substantially identical to those shown in FIG. 11, whose operation is described by FIG. 12. Therefore, that description will not be repeated.

When the M-series code generated from the spread spectrum demodulator is once synchronized with the A.C. supply, A.C. 100 V, this condition is locked, and first clock pulse signal CP1 continues to be generated and the synchronizing pulse S perfectly synchronized with the A.C. supply, A.C. 100 V. Accordingly, even if the phase of the A.C. supply was more or less changed for some reason, the generated M-series codes can be always synchronized with the A.C. supply. This operation can be instantly made with the turning-on of the power supply.

Figures 20, 21:
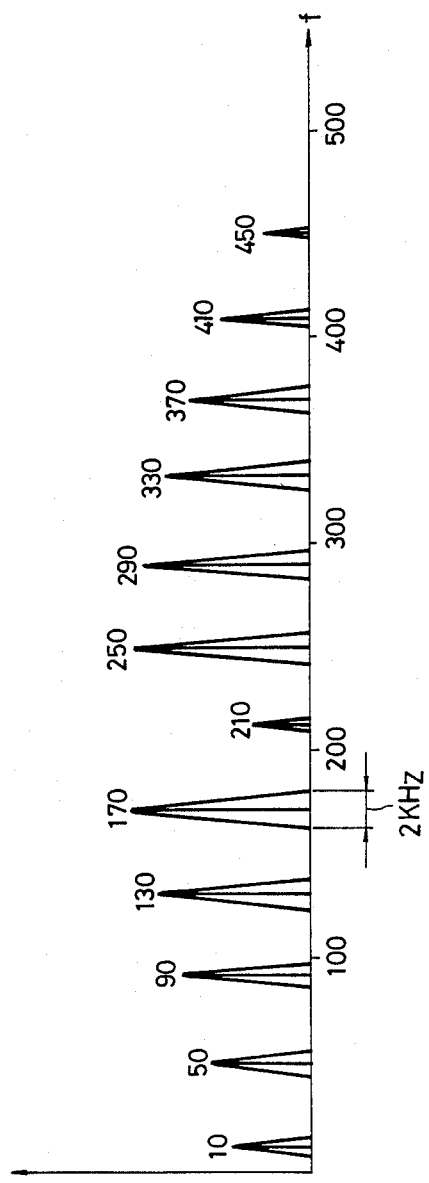
FIG. 20 is a diagram showing an example of the spectrum distribution of the transmission output produced from the transmitter of FIG. 19.
FIG. 21 is a diagram showing an example of the used frequency band of an interphone utilizing power line carrier frequency communication.

The code generated from transmitter M-series code generator 305 is subject to product-modulation together with the transmission data through the spread spectrum modulator 306 so that narrow-band data are produced as a modulated signal uniformly spectrum-spread over a wide band. In modulator 308 product-modulating is performed between the thus generated modulated signal and a second clock pulse signal CP2 supplied from clock oscillator 307 to thereby adjust a distribution position of the spectrum scattering modulated signal in accordance with a frequency of first clock pulse signal CP1 and the maximum code length of the M-series code. Assuming that the respective frequencies of first clock pulse signal CP1 and second clock pulse signal CP2, and the maximum code length of the M-series code are selected to be, for example, 280 KHz, 210 KHZ, and $2^3 - 1 = 7$, respectively, spectrum distribution of the spread spectrum modulated signal becomes such a state as shown in FIG. 20 so that any one of the used frequency bands as shown in FIG. 21 of an interphone utilizing the power line carrier frequency communication is not affected. After being amplified by transmitter amplifier 309, the output signal from modulator 308 is supplied to power line 103 via coupler 310.

The receiver line lock clock generator 313 and receiver M-series code generator 314 have the same construction as their transmitter counterparts line lock clock generator 304 and transmitter M-series code generator 305. A first clock pulse signal CP1 and a synchronizing pulse S both of which are synchronized with the A.C. supply are generated. Accordingly, M-series codes synchronized with the A.C. supply are generated from receiver M-series code generator 314 for the receiver. Coupler 315 picks up only the modulated signal supplied from transmitter 101 through power line 103. After being amplified by receiver amplifier 318, this modulated signal is supplied to demodulator 320. The demodulator 320 performs product-demodulation between the second clock pulse signal CP2 supplied from clock oscillator 319 and the modulated signal supplied by receiver amplifier 318 to thereby take out the spread spectrum modulated signal which is in turn transferred to the reverse spread spectrum demodulator 321. The M-series code supplied from receiver M-series code generator 314 and the spread spectrum modulated signal supplied from demodulator 320 are subject to product-demodulation through reverse spread spectrum demodulator 321 to thereby take out reception data.

Each of the M-series codes generated by transmitter M-series code generator 305 and the M-series code generated by receiver M-series code generator 314 is synchronized with the common A.C. supply, so that the two codes are prefectly synchronized with each other. Accordingly, reverse spread spectrum demodulator 321 performs product-demodulation onto the reception spectrum scattering modulated signal by using the same M-series code as that used at the time of modulation, the reception data being the same as the transmitted data so that it can be securely taken out. Although erroneous reception happens frequently when the transmission characteristics of power line 103 acting as a transmission line deteriorate extremely for some reasons, it is possible, in this case, to increase the transmission power by increasing the gain of transmitter amplifier 309 so as to enable correct reception to be made, because the spectrum distribution of the transmission signal is adjusted so as not to affect other used equipment as described above.

Although we have only described the case where the spectrum distribution of the transmission signal is set taking only the used frequency band of an interphone utilizing high frequency carrier communication into consideration, the present invention is not so limited. The spectrum distribution is easily set so as not to affect a used frequency band of other equipment similarly as in the case of the interphone. Further, it is not always necessary to synchronize the clock pulse used for generating the M-series code with the power supply, but, in short, any kind of generators can be used for the same purpose so long as they generate clock pulses for the transmitter and receiver which can be synchronized with each other.

It is possible to easily change the spectrum distribution of the transmission output. Therefore, by setting the spectrum distribution so as not to be overlapped on a used frequency band of other equipment connected to the same power line utilized by the apparatus according to the present invention, it is made possible to increase the transmission output without affecting the other equipment. Accordingly, there is such a superior effect that correct communication is performed even in the case where the transmission characteristics deteriorate.

Figure 22:
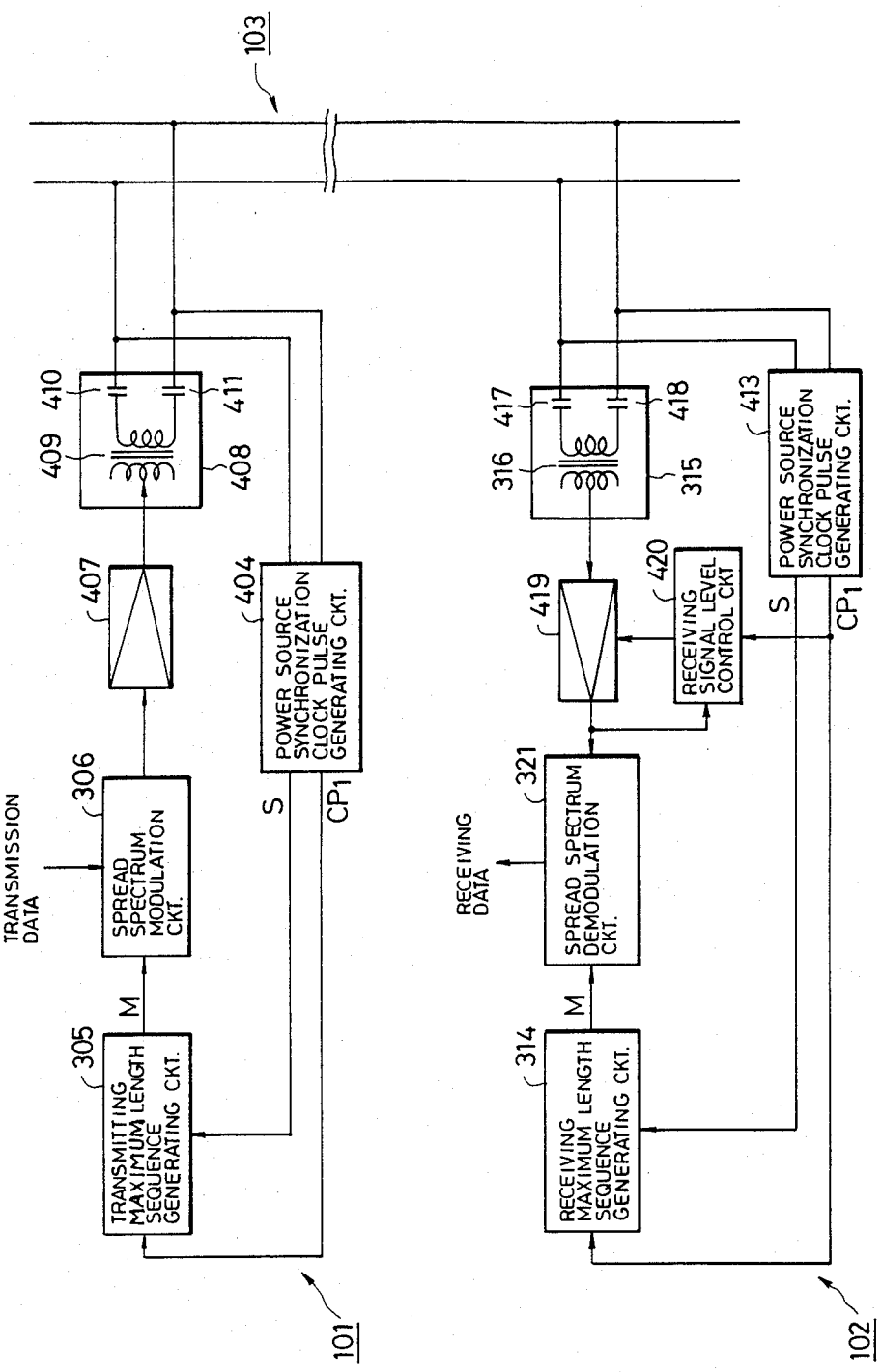
FIG. 22 is a block diagram of another embodiment of a spread spectrum arrangement for power line transmission according to the invention.

FIG. 22 is a block diagram of another embodiment of a power line communication arrangement according to the invention.

A transmitter 101 and receiver 102 are connected to power line 103. The transmitter includes a power source synchronization clock pulse generator circuit 404 which produces first clock pulse signal CP1 which is synchronous with an A.C. power source provided through power line 103 and has a frequency which is $K/2 \times 2N$ times as high as the A.C. power source frequency (where N is the maximum period of M-series code used, and K is an optional integer), and a synchronizing pulse S which is synchronous with the A.C. power source and has a frequency 2N times as high as the A.C. power source frequency. A transmitter M-series code generator 305 generates with an M-series code whose generation period is synchronous with the synchronizing pulse S. In spread spectrum modulator 306, the M-series code provided by transmitter M-series code generator 305 and transmission data are subjected to multiplication modulation thereby to output a spread spectrum modulation signal in which narrow band transmission data are uniformly distributed over a wide band. A transmitting amplifier 407 amplifies the output of spread spectrum modulator 306, and a coupler 408 supplies the output of transmitting amplifier 407 to power line 103. The coupler 408 comprises a transformer 409, a capacitor 410 and a capacitor 411.

Receiver 102 includes a clock pulse generating circuit 413 which is the same as clock pulse generating circuit 404 of transmitter 101. A receiver M-series code generator 314 is the same in arrangement as transmitter M-series code generator 305. A coupler 315 obtains the transmission output which is supplied thereto through power line 103. The coupler 315 comprises a transformer 316, capacitor 417 and capacitor 418. A variable gain receiving amplifier 419 amplifies the output of coupler 315. A receiving signal level control circuit 420 receives the output of variable gain receiving amplifier 419 and first clock pulse signal CP1 and applies a level control signal to variable gain receiving amplifier 419 to make the receiving signal level constant. A reverse spread spectrum demodulator 321 utilizes the M-series code output by receiver M-series code generator 314 to subject the spread spectrum modulation signal output by variable gain receiving amplifier 419 to multiplication demodulation thereby to output reception data.

Figure 23:
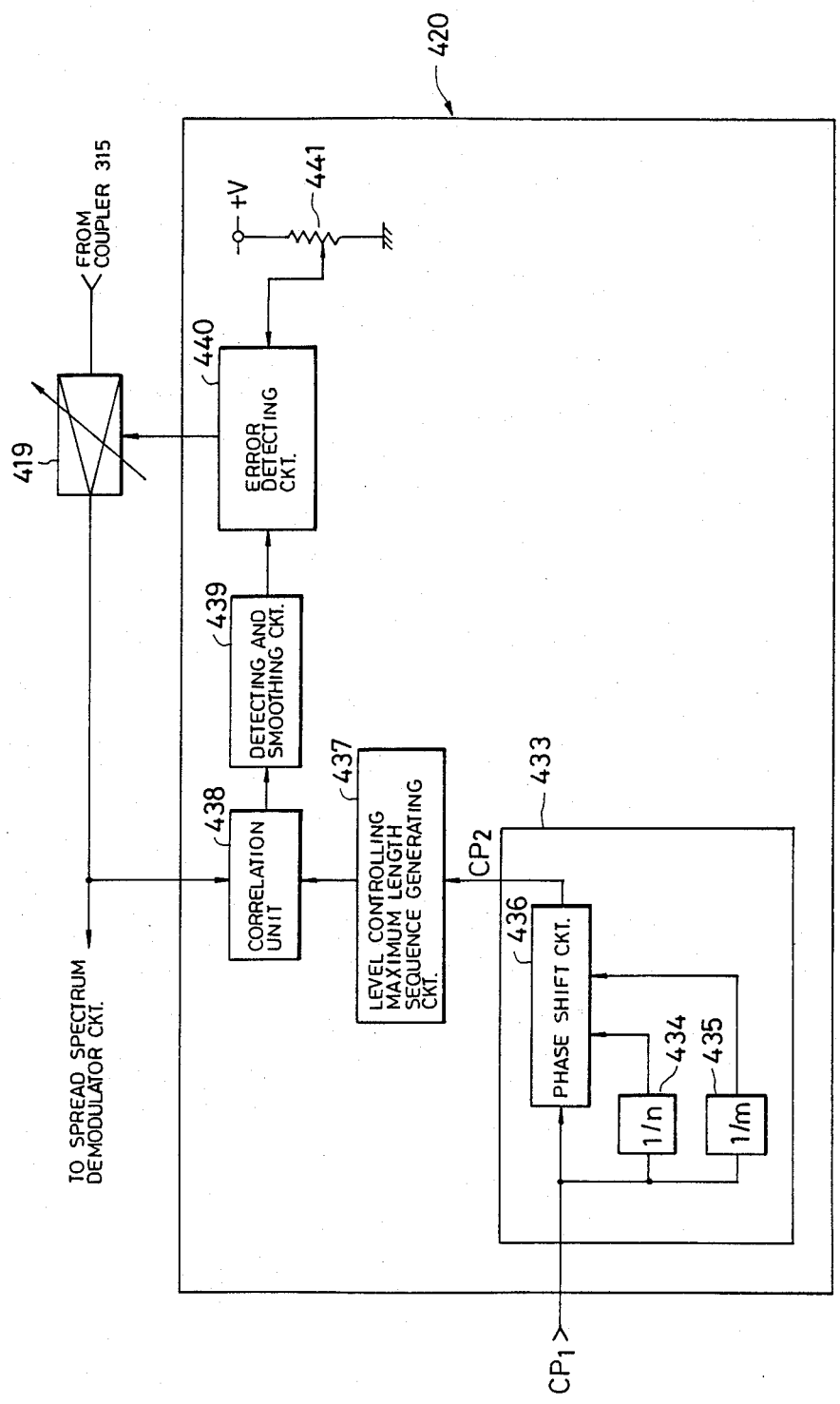
FIG. 23 is a block diagram showing one example of a receiving signal level control circuit of FIG. 22.

FIGS. 11 and 12 (previously described) explain the details of clock pulse generating circuits 404 and 413, transmitter M-series code generator 305 and receiver M-series code generator 314. FIG. 23 is a circuit diagram showing a specific example of a receiving signal level control circuit 420 of FIG. 22.

A clock pulse phase swinging circuit 433 swings the phase of first clock pulse signal CP1 to output second clock pulse signal CP2. The clock pulse phase swinging circuit 433 comprises: a frequency divider 434 which performs 1/n frequency division to specify a phase shift speed; a frequency divider 435 for subjecting first clock pulse signal CP1 to 1/m frequency division to determine a phase shift direction; and a transmission shift circuit 436 in which the phase of first clock pulse signal CP1 is shifted at the speed specified by frequency divider 434 and in the direction specified by frequency divider 435, to thereby second clock pulse signal CP2 whose phase is swung.

An M-series code generating circuit 434, responsive to second clock pulse signal CP2, generates the M-series code which is the same in code pattern as the M-series code output by transmitter M-series code generator 305 shown in FIG. 22. A correlation unit 438 correlates the output signal of variable gain receiving amplifier 419 with the level controlling M-series code generated by M-series code generating circuit 437. A detecting and smoothing circuit 439 detects and smooths the correlation output of correlation unit 438. An error detecting circuit 440 compares the output signal of detecting and smoothing circuit 439 with a reference value supplied by a variable resistor 441, and the error is supplied, as a level control signal, to variable gain receiving amplifier 419 thereby to make the reception signal level constant.

The M-series code produced by transmitter M-series code generator 305 and the transmission data are subjected to multiplication modulation in spread spectrum modulator 306 so that spread spectrum modulator 306 outputs a modulation signal in which the narrow band transmission data is spectrum-diffused over the wide band. As shown in FIG. 22, the modulation signal is amplified by transmitting amplifier 407 and supplied through coupler 408 to power line 103.

The clock pulse generating circuit 413 and receiver M-series code generator 314 in receiver 102 are the same in construction as clock pulse generating circuit 404 and transmitter M-series code generator 305 in transmitter 101. Therefore, first clock pulse signal CP1 and the synchronizing pulse S which are synchronous with the A.C. power (A.C. 100 V) are produced, the M-series code being synchronous with the A.C. power produced by receiver M-series code generator 314. The coupler 315 transmits only the modulation signal which is supplied through the power lines by the transmitter unit. The modulation signal passed through the coupler is amplified by 419 and supplied to reverse spread spectrum demodulator 321.

Variable gain receiving amplifier 419 is controlled by receiving signal level control circuit 420 which receives the output signal of variable gain receiving amplifier 419, so that the output signal of variable gain receiving amplifier 419 is made constant. When first clock pulse signal CP1 is synchronous with the A.C. power and is supplied from clock pulse generating circuit 413 to receiving signal level control circuit 420, clock pulse phase swinging circuit 433 produces second clock pulse signal CP2 which is provided by swinging the phase of first clock pulse signal CP1 in a certain range. The clock pulse phase swinging circuit 433 also outputs first clock pulse signal CP1 whose phase is shifted by transmission shift circuit 436. Phase shifting is carried out according to the output of frequency divider 435 which subjects first clock pulse signal CP1 to 1/n frequency division, and the phase shifting direction is switched according to the output signal of the frequency divider 434 adapted to subject the first clock pulse first clock pulse signal CP1 to 1/m (where m>n). The output of frequency divider 434 determines the phase shifting speed while the output of frequency divider 435 determines the phase shifting direction, to establish the swinging conditions. Thus, second clock pulse signal CP2 whose phase is swung is applied from clock pulse phase swinging circuit 433 to M-series code generating circuit 437. The M-series code generating circuit 437 generates the M-series code with the aid of second clock pulse signal CP2. The phase of second clock pulse signal CP2 is shifted at a period which is 1/n of its period (n being larger that the maximum bit number of the M-series code generated). Therefore, the phase of the M-series code generated is also shifted. The phase shifting direction of transmission shift circuit 436 is switched by the signal output whenever the first clock pulse first clock pulse signal CP1 is subjected to 1/m (m>n) frequency division by frequency divider 435 as a result of which the phase shifting direction of second clock pulse signal CP2 is reversed. Accordingly, M-series code generating circuit 437 produces the level controlling M-series code whose phase is swung in a certain range.

Figure 24:
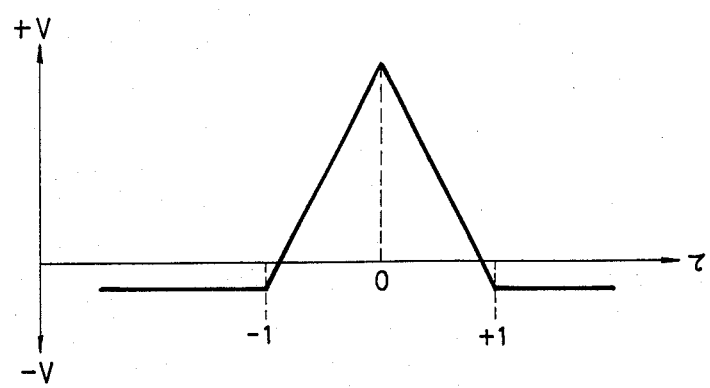
FIG. 24 is a waveform diagram showing the operation of the receiving signal level control circuit shown in FIG. 23.

The level controlling M-series code thus produced is applied to correlation unit 438 to obtain the correlation of the level controlling M-series code and the output signal of variable gain receiving amplifier 419. As the phase of the level controlling M-series code is swung, the output characteristic of correlation unit 438 is as shown in FIG. 24 in which $\tau$ is the phase difference between the M-series code included in the output of variable gain receiving amplifier 419 and the M-series code output by M-series code generating circuit 437. When the phase difference is zero, the correlation output is maximum, and the correlation output level is decreased as the phase difference increases in the positive (+) or negative (−) directions. Therefore, when the phase of the level controlling M-series code produced by M-series code generating circuit 437 is swung in the certain range as was described above, the output signal of correlation unit 438 becomes the A.C. signal in which the waveform shown in FIG. 24 whose peak occurs when the phases are completely coincided with each other is repeated.

The output signal of correlation unit 438 thus produced is rectified and smoothed by detecting and smoothing circuit 439 so that a DC output having a level corresponding to a peak value at the time of complete correlation is applied as a signal representing the level of reception signal output by variable gain receiving amplifier 419 to error detecting circuit 440. In error detecting circuit 440 the output signal of detecting and smoothing circuit 439 is compared with the signal supplied through variable resistor 441. The difference between the two signals is supplied, as a level control signal, to variable gain receiving amplifier 419. The variable gain receiving amplifier 419 varies the gain according to the level control signal to perform a feedback control, so that the reception signal level is held at the constant value corresponding to the reference value supplied by variable resistor 441. In this case, the signal compared with the reference value supplied by variable resistor 441 is obtained by detecting and smoothing the output signal of correlation unit 438 whose peak occurs at the time of complete correlation, and therefore represents accurately the level of the reception signal which is not affected by the noise signal in power line 103. Thus, the reception signal level can be positively made constant.

Reverse spread spectrum demodulator 321 utilizes the M-series code supplied from receiver M-series code generator 314 to subject the reception signal supplied thereto by variable gain receiving amplifier 419 to multiplication demodulation thereby to obtain the reception data.

Spread spectrum modulator 306 of the transmitter and coupler 315 of the receiver use first clock pulse signal CP1 and the synchronizing pulse S supplied from clock pulse generating circuit 404 and clock pulse generating circuit 413, respectively, so as to produce the M-series codes which are synchronous with each other; however, the invention is not limited thereto or thereby. That is, these circuits may be replaced by any circuits which can produce the M-series codes which are synchronous with each other. In the above-described embodiment, the first clock pulse signal CP1 outputted by clock pulse generating circuit 413 is applied to clock pulse phase swinging circuit 433. However, it is not always necessary that the clock pulse supplied to clock pulse phase swinging circuit 433 is synchronous with the A.C. power; that is, it may be any one which can provide a clock pulse which is synchronous with the clock pulse used for generation of the transmitting M-series code.

A clock pulse synchronous with the clock pulse used for generation of the M-series code on the side of the transmitter is generated on the side of the receiver and, the clock pulse is supplied to the M-series code generating circuit while its phase is swung with the period which is much longer than the period of the M-series code, thereby producing the M-series code whose phase swings in the same code pattern as the modulating M-series code. The M-series code is used to obtain the correlation with the output signal of the voltage-controlled variable gain receiving amplifier, whereby the correlation output including the peak value at the time of complete correlation with the reception signal is obtained without being affected by the noise in the power lines. The correlation output is rectified and smoothed to obtain the signal corresponding to the reception signal, and the difference between the signal and the reference signal is supplied, as the level control signal, to the aforementioned voltage-controlled variable gain receiving amplifier to form a feedback loop thereby to make the reception signal level constant. In this case, the correlation between the M-series code whose phase is swung and the output signal of the voltage-controlled variable gain receiving amplifier is obtained, and therefore the signal which is not affected by the noise signal and has a peak at the time of complete correlation corresponding to the reception signal level can be obtained. Therefore, the reception signal level can be positively controlled to be constant.

Figure 26:
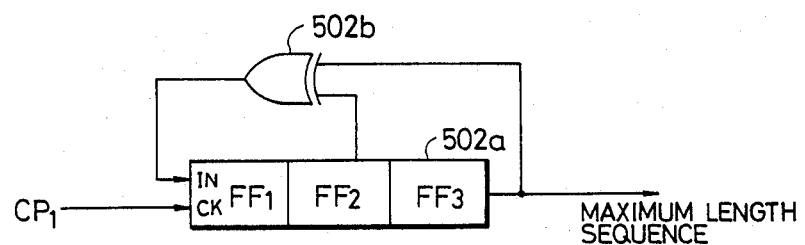
FIG. 26 is a schematic diagram showing one suitable circuit configuration of M-series code generating circuit 502 shown in FIG. 25.
Figure 25:
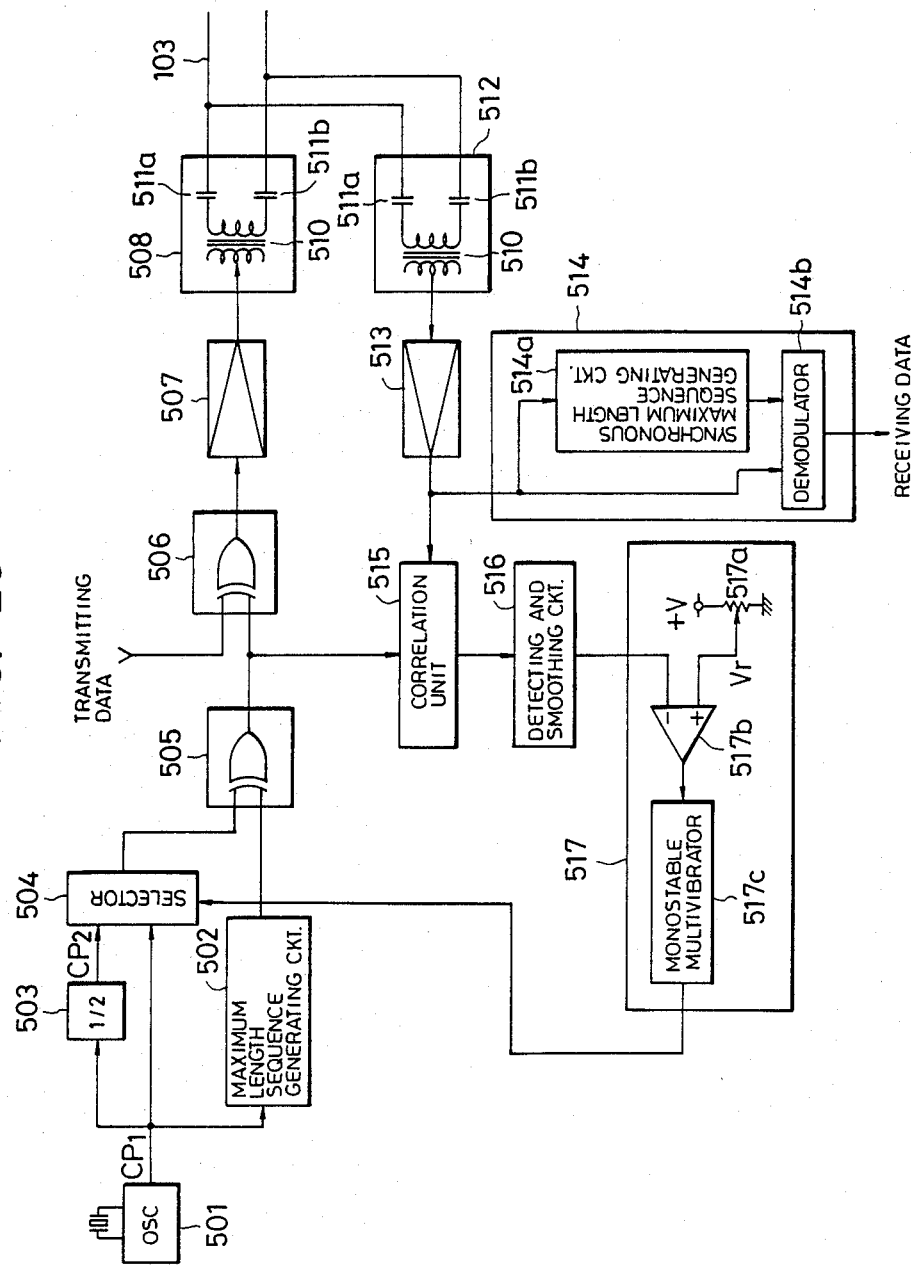
FIG. 25 is a block diagram of another embodiment of the communication arrangement according to this invention.

FIG. 25 is a block diagram of yet another embodiment of the invention. This embodiment includes a clock pulse generator 501 and an M-series code generating circuit 502 for generating an M-series code as a false noise signal by employing first clock pulse signal CP1 as a fundamental clock pulse which is produced by clock pulse generator 501. M-series code generating circuit 502 comprises (as shown in FIG. 26) a three stage shift register 502a and an exclusive OR gate 502b which receives the outputs of the second and third stages of three stage shift register 502a. The output signal of exclusive OR gate 502b is successively shifted with the aid of first clock pulse signal CP1, so that the final stage provides an M-series code having a maximum code length $2n-1$ (where n is the number of stages).

Referring back to FIG. 25, a frequency divider 503 provides second clock pulse signal CP2 by subjecting first clock pulse signal CP1 to $\frac{1}{2}$ frequency division. A selector 504 is controlled by a switching control circuit 517 (described later) to selectively output first clock pulse signal CP1 or second clock pulse signal CP2. A first modulator 505 then modulates the M-series code outputted by M-series code generating circuit 502 with the aid of selector 504. A second modulator 506 subjects transmission data to multiplication modulation to output a spread spectrum modulation signal in which narrow band transmission data are uniformly distributed, in the form of a spectrum, over a wide band. A transmitting amplifier 507 amplifies the output modulation signal of second modulator 506. A coupler 508 includes a transformer 510, a capacitor 511a and a capacitor 511b and couples the modulated signal onto power line 103.

A coupler 512 obtains the modulation signal applied to power line 103. The coupler 512 includes a transformer 510, a capacitor 511a and a capacitor 511b as in the case of coupler 508. A receiving amplifier 513 amplifies the output of coupler 512. A data demodulation section 514 connected to the output of amplifier 513 includes a synchronous M-series code generating circuit 514a which receives the output signal of coupler 512 and produces a demodulating M-series code which is synchronous with and coincident in code pattern with the M-series code which is used for the spread spectrum modulation of transmission data on the data transmitting side, and a demodulator 514b for using the M-series code produced by synchronous M-series code generating circuit 514a for multiplication modulation of the output signal of receiving amplifier 513.

A correlation unit 515 correlates the output signal of first modulator 505 with the output signal of receiving amplifier 513 at the time of data transmission. A detecting and smoothing circuit 516 detects and smooths the correlation output of correlation unit 515 to output a signal whose level corresponds to the transmission characteristic. A switching control circuit 517 controls the switching operation of selector 504 according to the output signal of detecting and smoothing circuit 516. The switching control circuit 517 includes a variable resistor 517a, a comparator 517b and a multivibrator 517c. The comparator 517b compares the output signal of detecting and smoothing circuit 516 with a reference value Vr provided by variable resistor 517a, and when the former is lower than Vr, an output is produced. The multivibrator 517c state is inverted according to the output signal of comparator 517b. The switching operation of selector 504 is controlled by the output signal "H" or "L" produced by multivibrator 517c.

In the data transmission mode provided in response to the production of transmission data, first clock pulse signal CP1 produced by the clock pulse generating circuit is applied to three stage shift register 502a, and the output signal of exclusive OR gate 502b is successively shifted so that the M-series code generating circuit outputs an M-series code having a code pattern which is determined by the number of stages in three stage shift register 502a and the shift register stage output pickup position of exclusive OR gate 502b.

The selector 504 receives at its input first clock pulse signal CP1 and second clock pulse signal CP2, which is provided by subjecting first clock pulse signal CP1 to ½ frequency division in frequency divider 503. In this connection, it is assumed that firstly selector 504 selects first clock pulse signal CP1 and supplies it to first modulator 505. Therefore, first modulator 505 outputs the signal (Manchester code) which is obtained by the multiplication modulation of the output M-series code of the M-series code generating circuit 502 with first clock pulse signal CP1, and applies it to second modulator 506. In second modulator 506, the multiplication modulation of the transmission data is effected with the output signal of first modulator 505. Therefore, second modulator 506 outputs a spread spectrum modulation signal in which the narrow band transmission data are uniformly distributed, in the form of a spectra, over a wide band. The modulation signal is amplified by transmitting amplifier 507 and supplied through coupler 508 to power line 103.

Figure 27:
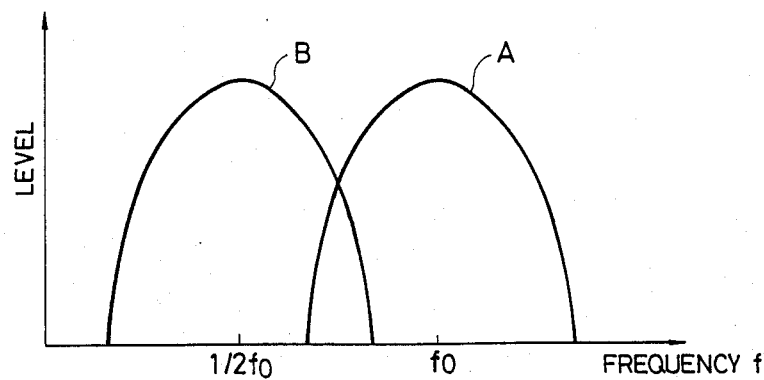
FIG. 27 is a graphical representation indicating the spectra of a main lope provided when a band used is switched.
Figure 28:
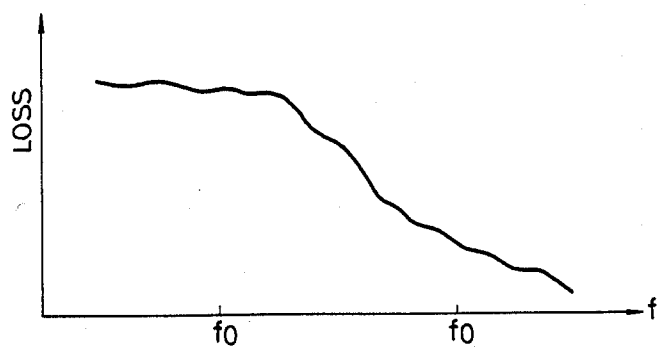
FIGS. 28 and 29 are graphical representations indicating transmission characteristic curves of power lines.

Coupler 512 picks up by transmission characteristic detection a part of the modulation signal transmitted through power line 103, and a part of the modulation signal is amplified by receiving amplifier 513. At the time of the data transmission mode, the modulation signal outputted by receiving amplifier 513 includes the transmission characteristic information for the transmission band used. Accordingly, when the correlation between the output signal of first modulator 505 and the output signal of receiving amplifier 513 is obtained by the correlation unit 515 and the correlation output is process by the detecting and smoothing circuit 516, the signal having the level which corresponds to the power line transmission characteristic for the transmission band used can be obtained. The output signal of detecting and smoothing circuit 516 then is compared with the reference value Vr in comparator 517b. When the output signal of detecting and smoothing circuit 516 is higher than the reference value, the transmission characteristic is sufficiently satisfactory, and the output of comparator 517b is "L". Accordingly, multivibrator 517c is maintained as it is, without being triggered. That is, the spectrum of the main lobe of the band used is as indicated by the characteristic curve A in FIG. 27 in which f0 is the frequency of first clock pulse signal CP1. When the transmission characteristic of the transmission path (power line 103) loss at the frequency f0 is less than ½f0 for example, as shown in FIG. 28, that state is maintained unchanged without changing the transmission band.

Figure 29:
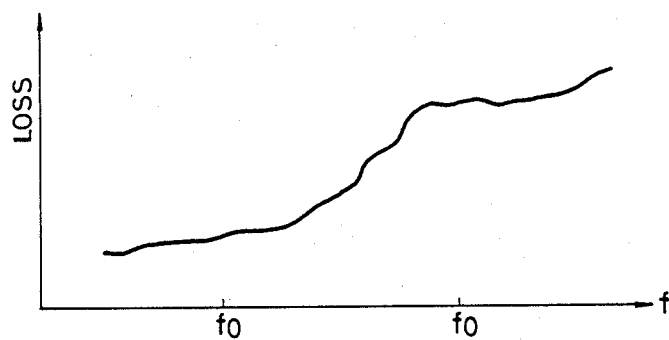

Assume that, in the transmission characteristic of power line 103, the loss at frequency f0 increases while the loss at frequency ½f0 decreases for some reason as shown in FIG. 29. When this occurs, the output signal level of detecting and smoothing circuit 16 representing the transmission characteristic in the band used becomes lower than the reference value Vr. As a result, the output of comparator 517b becomes "H", and the "H" output triggers multivibrator 517c to invert its output. Since the output signal of multivibrator 517c is employed as a switch control signal for selector 504, the selector 504 selects second clock pulse signal CP2, which is obtained by subjecting first clock pulse signal CP1 to ½ frequency division, and applies it to first modulator 505. As a result, the spectrum of the main envelope of the band used is as indicated as the characteristic B in FIG. 27. Under this condition, the output signal level of detecting and smoothing circuit 516 exceeds the reference value Vr, and therefore the output of comparator 517b is "L", so that multivibrator 517c is maintained as it is. Thus, the transmission characteristic is deteriorated in a relatively narrow band. Whenever the transmission characteristic of the band used is lowered, multivibrator 517c is triggered to invert its output to selector 504, so that the frequency of the clock pulse supplied to the first modulator 505 is changed to shift the band used thereby to improve the transmission characteristic. In this connection, it should be noted that in the data transmission mode, supplying of the signal to the data demodulation section is suspended (by a means not shown).

In the data receiving mode, application of the signal to the data demodulation section also is suspended (by a means not shown). Therefore, the modulation signal transmitted through the power lines 103 is picked up by coupler 512, amplified by receiving amplifier 513, and supplied to demodulator section 514. The demodulator section 514 produces a demodulating M-series code which is coincident both in phase and in code pattern with the M-series code used for modulation of the transmission data, according to a method of utilizing a modulation signal supplied or a power source synchronization method. The M-series code thus produced is supplied to demodulator 514b. The demodulator 514b demodulates the output signal of receiving amplifier 513 by using the demodulating M-series code, so as to pick up and output the reception data.

The output signal of the first modulator 505 is utilized for modulation of the transmission data; however, the invention is not limited thereto or thereby. For instance, the system may be so modified that the transmission data is modified with the M-series code and the modulation signal is modulated with the clock pulse outputted by the selector, thereby changing the band used. In this case, in the data demodulation section, the signal supplied by the receiving amplifier thereto should be used after being demodulated by using the clock pulse which coincides with the aforementioned modulation clock pulse. In the switching of the clock pulse, the condition that the level of the demodulation by the aforementioned clock pulse is higher than the set level should be selected by switching the clock pulse.

Thus, in the present invention a plurality of transmission bands are provided; the modulation signal transmitted through the power lines is picked up at the receiver; the correlation between the modulation signal thus picked up and the transmitting M-series code is detected and smoothed to obtain the signal which represents the transmission characteristic in the band used; and when the level of the signal thus obtained is lower than the reference level, the transmission band is switched. Consequently, when the transmission characteristic of the power lines is deteriorated in a relatively small band, the data transmission can be positively achieved by switching the transmission band.

FIG. 30 is a block diagram of another embodiment of a spread spectrum power line carrier frequency communications arrangement according to the present invention. The system also includes a transmitter 101 and a receiver 102 connected to a power line 103. In transmitter 101, a clock generator circuit 604 produces a clock pulse CP1 synchronous with A.C. power in power line 103 which has a frequency of K×2N times the frequency of A.C. and a pulse S synchronous with A.C. supplied and having a frequency of 2N times the frequency of A.C. (where N=maximum period of length of the gold code used and K=any integer). A gold code generator circuit 605 produces a gold code synchronous with the pulse S and with clock pulse CP1. An address setting unit 606 sets the address of a receiver and supplies its set output to gold code generator circuit 605 to make gold code generator circuit 605 produce a gold code G corresponding to the output. A modulator 607 produces a spread spectrum modulated signal wherein narrow-band transmitting data is uniformly distributed in a wide band area by multiplying the gold code G produced by gold code generator circuit 605 by the transmitting data. A transmitting amplifier 608 amplifies the output signal of modulator 607, and a transmitter coupler 609 including a transformer 610 and capacitors 611a and 611b transmitting amplifier 608 to power line 103.

Receiver 102 comprises a clock generator circuit 612 which produces pulses synchronous with A.C. supplied, a gold code generator circuit 613, an address setting unit 614, and a receiver coupler 615 similar to coupler 609. Elements clock generator circuit 612, gold code generator circuit 613, address setting unit 614 and receiver coupler 615 are identical to their corresponding transmitter elements including clock generator circuit 604, gold code generator circuit 605, address setting unit 606 and transmitter coupler 609, respectively, of the transmitter 101. The receiver 102 further includes receiving amplifier 616 which amplifies a received modulated signal from receiver coupler 615 and receiving data is demodulated through reverse spread spectrum demodulation in demodulator 617 by multiplying the gold code G produced by gold code generator circuit 613 by the output signal of receiving amplifier 616.

Figure 31:
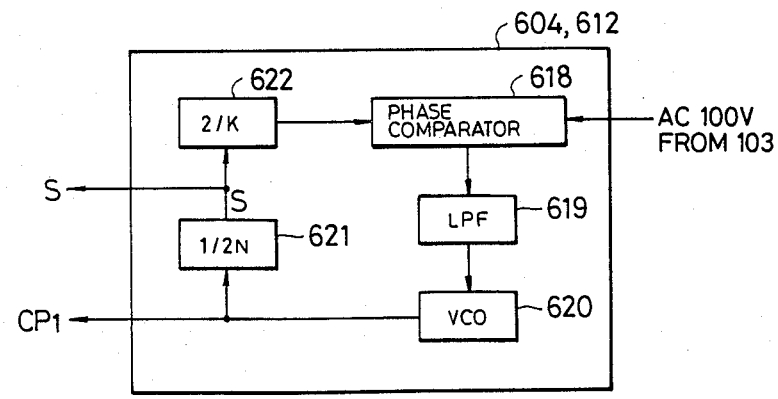
FIG. 31 is a circuit diagram of the A.C. synchronizing clock generator circuit of FIG. 30.

FIG. 31 is a circuit diagram showing the clock generator circuits of FIG. 32 for producing clock pulses synchronous with A.C. supplied, wherein there is shown an arrangement of a phase comparator 618 for comparing the phases of A.C. power (A.C. 100 V) supplied through power line 103 and the output signal of a divider 622, which will be described later, and for generating a signal at a level corresponding to the phase difference. A low pass filter 619 is responsive to the phase comparator for smoothing the output of phase comparator 618 and the output of low pass filter 619 is outputted to a voltage controlled variable frequency oscillator (VCO) 620 for producing clock pulse CP1 using the output signal of low pass filter 619 as a control input. A divider 621 responsive to CP1 produces a synchronizing pulse S by dividing down clock pulse CP1 into ½N (where N=maximum period of the gold code produced by gold code generator circuit 605 and gold code generator circuit 613), and a divider 622 divides down the synchronizing pulse S generated by divider 621 into 2/K (where K=optional integer) and supplies the divided pulse to phase comparator 618. The phase comparator 618, low pass filter 619, VCO 620, divider 621 and divider 622 together constitute a PLL (Phase Lock Loop) and cause the generation of clock pulse CP1 having a frequency synchronous with A.C. 100 V and of N×K times the frequency thereof and the pulse S synchronous with the A.C. and of 2N times the frequency thereof.

Figure 32:
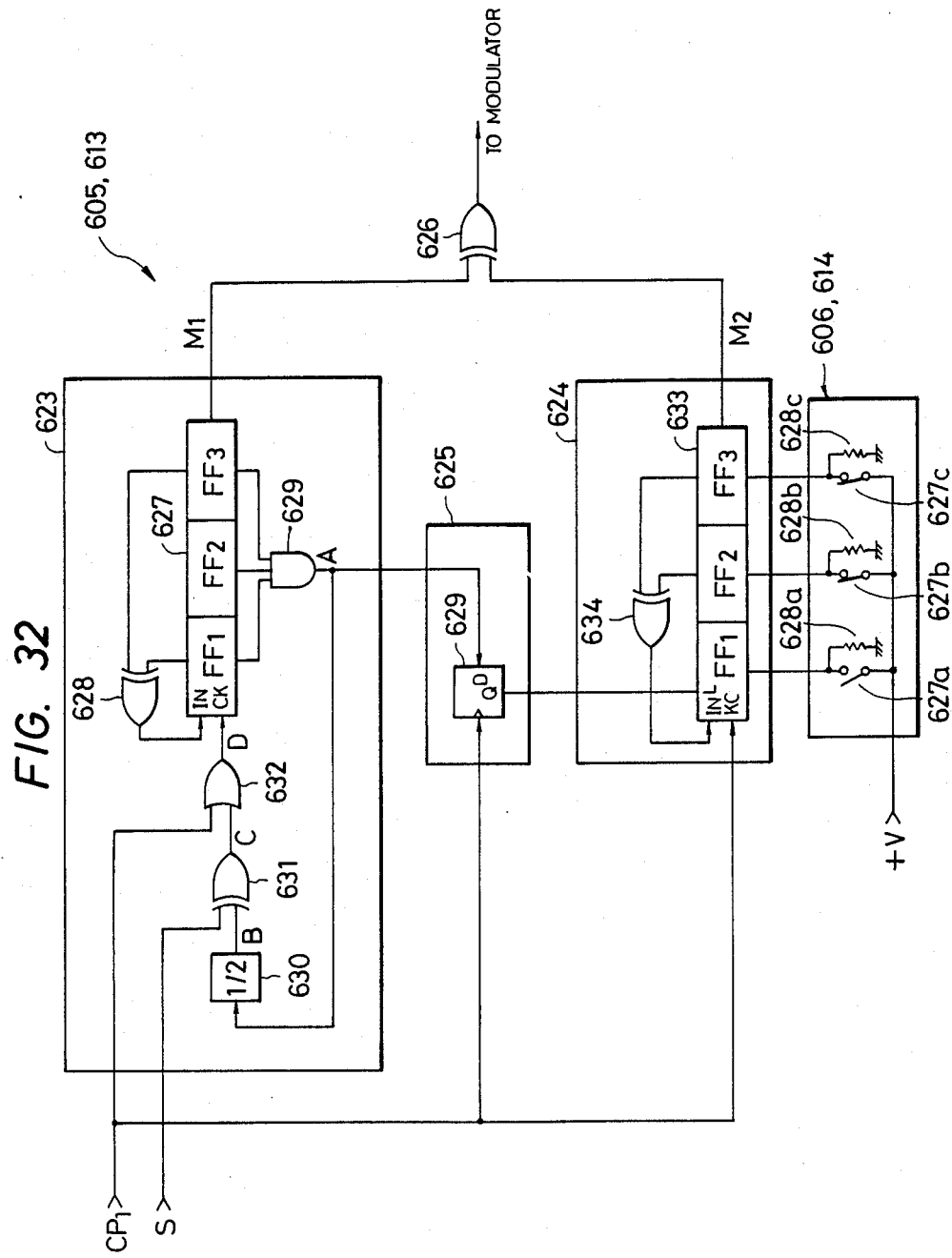
FIG. 32 is a circuit diagram of the gold code generator circuit and address setting unit of FIG. 30.

FIG. 32 is a circuit diagram showing gold code generator circuit 605, gold code generator circuit 613, address setting unit 606 and address setting unit 614. A first M sequential code generating circuit 623 receives the clock pulse CP1 and the synchronizing pulse S supplied by clock generator circuit 604 and clock generator circuit 612 and produces a first M sequential code M1 synchronous with the A.C. (A.C. 100 V). A second M- sequential code generating circuit 624 produces a second M sequential code M2 having the same code length as that of the M sequential code M1 produced by first M sequential code generating circuit 623 but having a different code pattern. A synchronizing control circuit 625 makes second M sequential code generating circuit 624 read the output signals of address setting unit 606 and address setting unit 614 under a certain setting condition of the M sequential code M1 produced by first M sequential code generating circuit 623 for initial setting purposes. An exclusive OR gate 626 produces the gold code G using the M sequential codes M1 with 2n−1 as a maximum code length, where the number of stages of the shift register 627 is assumed to be n, wherein flip flop circuits FF1–FF3 are connected in series and an exclusive OR gate 628 obtains the exclusive OR of the output signals of the flip-flop circuits FF1 and FF3 and feeds back the results to the input thereof. Moreover, the first M sequential code generating circuit 623 is equipped with an AND gate 629 for seeking conformity among the outputs in all stages of shift register 627, a divider 630 for dividing down by 2 the output signal A of AND gate 629, an exclusive OR gate 631 for receiving the output signal B of the divider 630 and the synchronizing clock signal S supplied by clock generator circuit 604 and clock generator circuit 612, and an OR gate 632 for receiving the output signal C of exclusive OR gate 631 and clock pulse CP1 and supplying an output signal D to the clock input of shift register 627.

The second M sequential code generating circuit 624 comprises a shift register 633 having the same number of stages as that of shift register 627 and is used for receiving clock pulse CP1 as a clock input. Second M sequential code generating circuit 624 also comprises an exclusive OR gate 634 for receiving the output signal of the flip flop circuits FF1–FF3 and for feeding back its output signal to the input of shift register 633. The second M- sequential code generating circuit 624 is so arranged as to input the output signals of address setting unit 606 and address setting unit 614 synchronously with the control signal supplied by synchronizing control circuit 625 to the shift register as an initial condition. The second M sequential code generating circuit 624 produces the M sequential code M2 having the same code length as that of the first M sequential code M1 produced by first M sequential code generating circuit 623 and a different code pattern which is phase shifted according to the output signals of address setting unit 606 and address setting unit 614. Each of the address setting unit 606 and address setting unit 614 comprises switches 627a–627c with one end of each switch connected to a power supply +V and pull-down resistors 628a–628c, whereas the synchronizing control circuit 625 comprises a D type flip flop 629 for receiving clock pulse CP1 as a clock input and the output signal A of the AND gate 629 as an input, its set output being supplied to the shift register 633 as a load signal.

The timing operation of the FIG. 32 embodiment is essentially as shown in FIG. 12 and will therefore not be repeated.

The synchronizing control circuit 625 is formed with the D type flip flop for receiving, as a D input, the output signal A of AND gate 629 for detecting the condition under which the whole output of the shift register becomes all "1". Accordingly, AND gate 629 produces the load control signal out of its set output Q for only a period of clock pulse CP1 when shift register 627 becomes all "1" and is reset. The load control signal is supplied to the load terminal shift register 633 forming second M sequential code generating circuit 624, and the flip flop circuits FF1–FF3 read the output signals of the switches 627a–627c of address setting unit 606 and hold the readouts, respectively. When clock pulse CP1 is successively supplied, second M sequential code generating circuit 624 produces the M sequential code M2 by successively shifting the output signal of exclusive OR gate 634. In this case, shift register 627 and shift register 633 have the same number of stages, the M sequential codes M1, M2 being produced by first M sequential code generating circuit 623 and second M sequential code generating circuit 624 and having the same code length but entirely different code patterns because the input conditions of exclusive OR gate 628 and exclusive OR gate 634 are different. Moreover, second M-sequential code generating circuit 624 is initially set by the output of the address setting unit, and the phase of the M-sequential code M2 generated is set thereby. The M sequential codes M1, M2 thus produced by first M sequential code generating circuit 623 and second M sequential code generating circuit 624 are inputted into exclusive OR gate 626 for determining the gold code G. The phase of the M sequential code produced by second M-sequential code generating circuit 624 may be varied with the output signal of address setting unit 606 so that the corresponding gold code G is changed accordingly. In consequence, a gold code G in conformity with the inherent gold code used when receiver 102 effects demodulation is formed by adapting the address setting unit 606 to the address of 102.

The gold code inherent in the receiver unit and produced by gold code generator circuit 605 is added to the transmitting data in modulator 607, whereby narrowband transmitting data is generated as a uniformly spread spectrum modulated signal in a wide band area. The modulated signal is amplified by transmitting amplifier 608 before being supplied through transmitter coupler 609 to power line 103.

Clock generator circuit 612 and gold code generator circuit 613 on the part of receiver 102 are the same in construction as the counterparts on the part of the transmitter. The clock pulse CP1 and the pulse S synchronous with the A.C. (A.C. 100 V) are produced, thus causing the gold code G synchronous with the A.C. to be produced. The receiver 102, however, produces an inherent gold code by setting a predetermined self address in address setting unit 614.

Receiver coupler 615 obtains the modulated signal supplied through power line 103, and the output signal thereof is amplified by receiving amplifier 616 and supplied to demodulator 617. The demodulator 617 multiplies the modulated signal supplied by receiving amplifier 616 by the gold code G supplied by gold code generator circuit 613 and obtains receiving spread spectrum demodulated data. The receiving modulated signal can be demodulated only when it has been modulated by a gold code conforming to the gold code generated by gold code generator circuit 613, and therefore the gold code is simultaneously used as the address signal, i.e., only a receiver 102 setting an address in conformity with the address setting unit 606 of the opposite transmitter unit 101 in its own address setting unit 614 is capable of demodulating the modulated signal sent by that transmitter unit 101 and obtaining the receiving signal.

In that case, accordingly, it becomes unnecessary to add the address of an addressee to the transmitting data and transmission efficiency is increased to the extent of the address data, whereby polling and response speed can be quickened. When the operations of the transmitter and receiver units are conformed to each other with the generation of the clock synchronous with the A.C., the interference of the transmitted signals is avoided even if communication is conducted.

Although the above description has referred to a case where the clock pulses produced by transmitter and receiver units are made synchronous with A.C. and conformed to each other, the synchronization with the A.C. is not always needed. In addition, various synchronizing methods are also applicable.

In the present embodiment a gold code corresponding to the address of an addressee predetermined by a transmitter unit is produced, and transmitting data is modulated using the gold code and supplied through a power line, whereas a receiver unit demodulates the receiving modulated signal using a gold code corresponding to its own predetermined address. The gold code is simultaneously usable as the address signal, and it is therefore unnecessary to include the address signal in the transmitting data. Since the quantity of transmitting data can be reduced to the extent of the address signal, polling and response speed are increased. Since the speed of the spread spectrum power line carrier frequency communications is relatively low, the applications to control signal transmission are particularly effective. Moreover, the generation of the clock pulses for use in the generation of the gold codes in the transmitter and receiver units is synchronous with A.C. power in the power line, and both gold codes are conformed to each other thereby. Consequently, the interference of the gold codes with each other is largely reduced and communication with a plurality of units can be carried out accurately and effectively.

Various improvements in power line communication techniques have been described. Although the present invention has been described with reference to preferred embodiments, numerous modifications and rearrangements can be made, and still the result will come within the scope of the invention.

I claim:

1. A spread spectrum power line carrier frequency communications method comprising the steps of:
   connecting a plurality of slave units and one master unit to a common power line,
   checking by a slave unit for the presence of a correlative output signal of a correlator responsive to a signal transmitted by any other slave unit on said power line when the slave unit needs to transmit a signal,
   in the event that a checking slave unit does not detect a correlative output signal representing that a signal has been transmitted by another slave unit, transmitting a data signal using spread spectrum modulation with maximum length sequence, but in the event that a checking slave unit detects a correlative output signal representing that a signal has been transmitted by another slave unit, not transmitting, and
   receiving via said power line by said master unit said data signal and demodulating it.

2. A spread spectrum power line carrier frequency communications method comprising the steps of:
   connecting a plurality of slave units and one master unit to a common power line,
   checking by each slave unit for the presence of a signal transmitted by any other slave unit and flowing through said power line when each slave unit needs to transmit a signal,
   in the event that a checking slave unit detects transmission by another slave unit, not transmitting a data signal therefrom, but in the event that a checking slave unit does not detect a data signal, a transmitting slave unit, transmitting a data signal, a transmitting slave unit adding a sequential transmission code having the same code pattern as that of a first maximum length sequence transmission code of said data signal and a phase difference inherent in each slave unit to the modulated data signal which is obtained by subjecting a transmitting data signal to spread spectrum modulation with said first maximum length sequence transmission code, said transmitted data signal being transmitted to said master unit through said power line,
   receiving by said master unit the spread spectrum modulated signal transmitted through said power line and demodulating it, and
   said master unit discriminating each transmitting slave unit from the others using the phase difference between the maximum length sequence used when the spread spectrum modulated signal is produced and what is added to the spread spectrum modulated signal and transmitted through said power line.

3. A method according to claim 2, wherein a first slave unit detects the presence of a signal transmitted by a second slave unit and flowing through said power line by sequentially shifting the phase of said sequential transmission code and checking for the presence of a correlation therewith.

4. A system for spread spectrum power line carrier frequency communications, comprising:
   a plurality of slave units and one master unit, each slave unit including:
   first and second maximum length sequence generator circuits for generating maximum length sequences having phase differences inherent in said slave units and identical code patterns, respectively, with said first and second maximum length sequence generator circuits having identical clock pulses as inputs,
   a modulator for spread spectrum modulating a transmitting data signal with the maximum length sequence produced by the first maximum length sequence generator circuit,
   a correlator for correlating a signal supplied by a power line through a coupler with the maximum length sequence produced by said second maximum length sequence generator circuit,
   a synchronizing control circuit for judging the presence of a signal transmitted by any other slave unit from the presence of a correlative output of said correlator when the phases of the maximum length sequence generated by said first maximum length sequence generator circuit and said second maximum length sequence generator circuit are varied,
   a clock control circuit controlled by said synchronizing control circuit for sequentially shifting the phase of the identical clock pulses when the transmission of a data signal is needed, and
   a switch circuit for sending a transmitting signal to said power line through said coupler, said transmitting signal being a combination of the spread spectrum modulated signal produced by said modulator only when said synchronizing control circuit has judged that no signal is transmitted by any other slave unit and the maximum length sequence produced by said second maximum length sequence generator circuit.

5. A system for spread spectrum power line carrier frequency communications, comprising:
   a plurality of slave units and one master unit, said master unit comprising:
   a first maximum length sequence generator circuit and a second maximum length sequence generator circuit responsive to respective identical clock pulses for respectively producing maximum length sequences having the same code patterns as those produced by said slave unit used for spread spectrum modulation,
   a clock control circuit for outputting said respective identical clock pulses and for sequentially shifting the clock pulse phase supplied to said first and second maximum length sequence generator circuits,
   a synchronizing control circuit for controlling said clock control circuit to sequentially shift the clock pulse phase,
   a correlator for obtaining the correlation of a receiving signal supplied from a power line through a coupler to the maximum length sequence produced by said second maximum length sequence generator circuit and for sequentially shifting the phase of the maximum length sequence produced by said second maximum length sequence generator circuit, a correlative output being used to stop the shifting of the clock pulse phase by said synchronizing control circuit,
   a phase shift control circuit for sequentially shifting the phase of the maximum length sequence produced by said first maximum length sequence generator circuit while the correlative output is being generated by said correlator, and
   a demodulator for producing a receiving signal by demodulating the receiving spread spectrum modulated signal supplied by said coupler using the maximum length sequence produced by said first maximum length sequence generator circuit and stopping the operation of said phase shift control circuit according to said signal received.

6. A system according to claim 5, wherein a slave transmitting a signal is discriminated according to the output signal of said phase shift control circuit when a receiving signal is produced by said demodulator.

7. A system according to claim 5, wherein the generation of the clock pulse for use in each of said slave units and master unit is synchronous with A.C. power supplied through said power line used as a transmission line.

8. A spread spectrum power line carrier frequency line lock communications method comprising the steps of:
generating first and second clock pulses in each of a transmitter and a receiver, said first clock pulse being synchronized in phase with an A.C. supply flowing in a power line used as a transmission line and having a frequency (K×N) times as high as that of said A.C. supply, and said second clock pulse being synchronized in phase with said A.C. supply and having a frequency K/2 times as high as that of said A.C. supply, where N represents the maximum period length of a maximum length sequence generated in said transmitter and K represents an integer;
generating said maximum length sequence with said first clock pulse providing a basic timing thereof, said maximum length sequence having a generation period coincident with the period of "H" and "L" of said second clock pulse;
spread spectrum modulating transmission data and supplying it onto said power line; and
spread spectrum demodulating a received modulated signal from said power line by using a maximum length sequence the same as said maximum length sequence synchronized with said A.C. supply.

9. A line lock communication apparatus for a spread spectrum power line carrier frequency communication system, comprising:
a transmitter including a line lock clock generator for generating a first clock pulse which is synchronized in phase with an A.C. supply flowing in a power line utilized as a transmission line, said first clock pulse having a frequency K×N times as high as that of said A.C. supply, where N represents the maximum period length of a maximum length sequence used in said transmitter and K represents an integer, said line lock clock generator also generating a second clock pulse which is synchronized in phase with said A.C. supply and which represents a generation period of said maximum length sequence by changing its level between "H" and "L", a maximum length sequence generator for generating said maximum length sequence, said maximum length sequence having said first clock pulse as a basic timing thereof and having a period synchronized with a change in level between "H" and "L" of said second clock pulse, a spread spectrum modulator for product-modulating transmission data using said maximum length sequence generated by said maximum length sequence generator to thereby generate a modulated signal in which said transmission data are spread spectrum modulated over a wide band, and a coupler for supplying said spread spectrum modulated signal onto said power line; and a receiver including a line lock clock generator and a maximum length sequence generator having the same construction as that of said transmitter, a coupler for receiving said modulated signal from said power line, and a spread spectrum demodulator for demodulating said modulated signal transferred from said coupler using said maximum length sequence generated from said maximum length sequence generator so as to provide reception data.

10. An apparatus according to claim 9, wherein said line lock clock generator in each of said transmitter and said receiver comprises:
a voltage controlled variable frequency oscillator for generating said first clock pulse,
a first frequency divider for frequency-dividing said first clock pulse to thereby generate said second clock pulse having a frequency $\frac{1}{2}N$ times as high as that of said first clock pulse,
a second frequency divider for frequency-dividing said second clock pulse into an output having a frequency 2/K times as high as that of said second clock pulse,
a phase comparator for comparing a phase of the output signal of said second frequency divider with that of said A.C. supply flowing in said power line to thereby generate an output signal corresponding to a difference in phase, and
a low-pass filter for smoothing the output signal of said phase comparator to thereby supply a control signal to said voltage controlled variable frequency oscillator.

11. An apparatus according to claim 9, wherein said maximum length sequence generator in each of said transmitter and said receiver comprises:
a shift register,
a first exclusive OR gate for exclusively ORing output signals generated from a plurality of stages of said shift register and for feeding-back a resulting output of the exclusive ORing to an input terminal of said shift register to thereby generate said maximum length sequence,
an AND gate for ANDing the output signals generated from all the stages of said shift register,
a frequency divider for frequency-dividing an output signal of said AND gate into an output signal having a frequency $\frac{1}{2}$ times as high as that of said output signal of said AND gate,
a second exclusive OR gate for exclusively ORing said output signal of said frequency divider and said second clock pulse supplied from said line lock clock generator, and
an OR gate for ORing an output signal of said exclusive OR gate and said first clock pulse supplied from said line lock clock generator to thereby supply a resulting output signal as a basic clock to said shift register.

12. A spread spectrum power line carrier frequency communications method comprising the steps of:
connecting a plurality of slave units and one master unit to a common power line,
supplying from a slave unit to said power line, a spread spectrum modulated data signal formed by multiplicatively modulating data using an inherent gold code of said slave unit, and
monitoring by said master unit each of said slave units by successively producing the gold code inherent in each slave unit for use to multiplicatively demodulate a received spread spectrum modulated signal supplied through said power line and to discriminate a slave unit transmitting the receiving signal relative to the gold code generated.

13. A method according to claim 12, wherein said master unit locks up the gold code successively produced while the receiving signal is being generated.

14. A method according to claim 12, wherein each slave unit produces the inherent gold code by combining the phases of a first maximum length sequence and a second sequential code having patterns different from each other on a slave unit basis.

15. A system for spread spectrum power line carrier frequency communications, comprising:
a plurality of slave units, each slave unit comprising a gold code generator circuit for producing a gold code inherent in each slave unit, a modulator for spread spectrum modulating data to be transmitted using multiplicative modulation by means of the gold code, and a coupler for supplying said spread spectrum modulated signal to a power line, and
a master unit, said master unit comprising a coupler for receiving the spread spectrum modulated data from the power line, a gold code generator circuit for successively producing the gold code inherent in each slave unit, and a demodulator for demodulating the spread spectrum modulated data by multiplicative demodulation by means of the gold code produced by said gold code generator circuit of said master unit.

16. A system according to claim 15, wherein said gold code generator circuit in each slave unit comprises:
a first maximum length sequence generator circuit and a second maximum length sequence generator circuit, each formed of a shift register and a feedback circuit,
a setting circuit for setting a predetermined value inherent in each slave unit in the shift register forming said second maximum length sequence generator circuit, and
a gate circuit for combining maximum length sequences produced by said first and second maximum length sequence generator circuits and generating a gold code having a pattern inherent in each slave unit.

17. A spread spectrum power line carrier frequency communications system, comprising:
a transmitter providing a maximum length sequence and transmission data which are product-modulated so that said transmission data generate a spread spectrum modulated signal which is supplied onto a power line, and
a receiver for receiving said modulated signal from said power line and product-demodulating said modulated signal using a maximum length sequence that is the same as that used in said transmitter to thereby obtain reception data,
wherein said spread spectrum modulated signal in said transmitter is modulated again by using a clock pulse and is then transmitted to said receiver through said power line, and
wherein a frequency of a clock pulse used when said maximum length sequence is generated, a frequency of said clock pulse used when said spread spectrum modulated signal is modulated again, and a maximum code length of said maximum length sequence are of values at which a spectrum distribution of a transmitter output does not affect other equipment connected to said power line.

18. A system according to claim 17, in which the frequencies of said clock pulses used respectively for generating said maximum length sequence and for modulating said spread spectrum modulated signal again, and said maximum code length of said maximum length sequence are selected to be 280 Khz, 21 KHz, and 7 bits, respectively, to thereby set said spectrum distribution of said transmitter output so as not to affect a frequency band of an interphone system which is +15 KHz wide and has a center frequency selected to be one of 230 KHz, 270 KHz, 310 KHz, 350 KHz, 390 KHz, and 430 KHz.

19. A spread spectrum power line carrier frequency communications apparatus, comprising:
a transmitter including a clock generator for generating a first clock pulse, a maximum length sequence generator for generating a maximum length sequence in response to said first clock pulse produced by said clock generator, a spread spectrum modulator for performing spread spectrum modulation of transmission data using said maximum length sequence, a clock oscillator for generating a second clock pulse, a modulator for modulating an output of said spread spectrum modulator using said second clock pulse, and a coupler for transferring the modulated output to said power line; and
a receiver connected to said transmitter through a power line utilized as a transmission line, said receiver including a coupler for receiving the modulated output on said power line, a clock generator for generating a first clock pulse having the same frequency as said first clock pulse generated in said transmitter, a maximum length sequence generator for generating a maximum length sequence having the same code pattern as said maximum length sequence generated in said transmitter by using said first clock pulse generated in said clock generator of said receiver, a second clock oscillator for generating a second clock pulse having the same frequency as said second clock pulse generated in said clock oscillator of said transmitter, a demodulator for demodulating an output of said coupler connected to said power line by using said second clock pulse generated by said second clock oscillator to thereby isolate a spread spectrum modulated signal, and a spread spectrum demodulator for demodulating an output of said demodulator by using said maximum length sequence generated by said maximum length sequence generator to thereby isolate reception data, wherein respective frequencies of said first and second clock pulses and the maximum code length of said maximum length sequence in each of said transmitter and said receiver are of values at which a spectrum distribution of said transmission output transmitted from said transmitter has no influence on other equipment connected to said power line.

20. An apparatus according to claim 19, in which said clock generator in each of said transmitter and said receiver generates said first clock pulse in synchronism with an A.C. supply flowing in said power line.

21. A power line transmission type spread spectrum communications method in which on the side of a transmitter a maximum length sequence is produced and transmission data are subjected to multiplication modulation so as to produce a spread spectrum modulation signal which is supplied to power lines, and on the side of a receiver the same maximum length sequence as that used on the side of the transmitter and the modulation signal received through said power lines are used to subject reception data to multiplication demodulation, said method including the steps of:

at said receiver, producing a receiving signal level adjusting maximum length sequence which is synchronous with the maximum length sequence provided by said transmitter and has the same code pattern as the maximum length sequence provided by said transmitter, said receiving signal level adjusting maximum length sequence being swung in a predetermined range with the phase thereof shifted, correlating the output between said receiving signal level adjusting maximum length sequence and said received modulation signal to obtain a signal corresponding to said received modulation signal without being affected by a noise signal, and adjusting said received modulation signal such that the difference between said signal corresponding to said received modulation signal and a reference value is made constant.

22. A spread spectrum power line communications system, comprising:

a transmitter unit and a receiver unit which are connected through power lines utilized as a transmission path, said transmitter unit comprising:

a clock pulse generating circuit for producing a clock pulse, a transmitting maximum length sequence generating circuit for producing a maximum length sequence with the aid of said clock pulse produced by said clock pulse generating circuit, a modulator for spread spectrum modulating data to be transmitted using said maximum length sequence, and a coupler for supplying the resulting spread spectrum modulated signal to said power lines; and said receiver unit comprising:

a clock pulse generating circuit for generating a clock pulse synchronous with said clock pulse in said transmitter unit, a receiving maximum length sequence generating circuit for producing a maximum length sequence which is the same as the maximum length sequence in said transmitter unit, with the aid of said clock pulse produced by said clock pulse generating circuit of said receiver unit, a coupler for receiving said modulation signal supplied through said power lines, a voltage-controlled variable gain receiving amplifier for amplifying an output of said coupler, a clock pulse phase swinging circuit for stepping the phase of said clock pulse produced by said clock pulse generating circuit of said receiver unit in a predetermined direction to thereby swing the phase of said clock pulse, a level controlling maximum length sequence generating circuit for producing a level controlling maximum length sequence which is the same in code pattern as said maximum length sequence generated by said receiving maximum length sequence generating circuit, with the aid of the clock pulse provided by said clock pulse phase swinging circuit, a correlation unit for correlating said level controlling maximum length sequence with an output signal of said voltage-controlled variable gain receiving amplifier, a detecting and smoothing circuit for detecting and smoothing an output of said correlation unit, an error detecting circuit for applying the difference between an output signal of said detecting and smoothing circuit and a reference value as a level control signal to said voltage-controlled variable gain receiving amplifier, and a spread spectrum demodulator for demodulating the received signal from said variable gain receiving amplifier by multiplicative demodulation using said maximum length sequence supplied by said receiving maximum length sequence generating circuit.

23. A system according to claim 22, wherein said clock pulse generating circuit in each of said transmitter unit and receiver unit is a power source synchronization clock pulse generating circuit which synchronizes the outputted clock pulse with the A.C. power which is applied to said power lines.

24. A power line transmission type spread spectrum communications method, comprising the steps of:

on a data transmitting side, subjecting a maximum length sequence and transmission data to multiplication modulation so as to produce a modulation signal in which said transmission data are spread in the form of a spectrum, supplying said modulation signal to power lines, on the data receiving side, subjecting a maximum length sequence which is the same as that produced at the time of data transmission and reception data of said modulation signal received through said power lines to multiplication demodulation, correlating said modulation signal supplied to said power lines with said transmitted maximum length sequence in a correlating means, detecting and smoothing a correlation output of said correlation means, and when the level of a signal which is obtained by detecting and smoothing said correlation output becomes lower than a reference value, switching a frequency band used for said modulation signal.

25. A method according to claim 24, wherein one of said maximum length sequence and said modulation signal on the data transmitting side is subjected to multiplication modulation with a clock pulse, and the frequency of said clock pulse is changed to switch said frequency band used.

26. A power line transmission type spread spectrum communication system, comprising a transmitter unit and a receiver unit which are connected to each other through power lines which are utilized as a data transmission path, said transmitting unit comprising:

a clock pulse generating circuit for generating a clock pulse;

a maximum length sequence generating circuit for generating a maximum length sequence with the aid of said clock pulse produced by said clock pulse generating circuit;

a divider for dividing said clock pulse so as to produce a frequency division output of said clock pulse;

a selector for selecting between said clock pulse produced by said clock pulse generating circuit and said frequency division output of said divider;

modulation means for subjecting an output signal of said selector, said maximum length sequence and transmission data to multiplication modulation; and a first coupler for supplying an output of said modulator to said power lines; and said receiver unit comprising:

a second coupler for receiving a modulation signal supplied to said power lines by said first coupler;

a correlation unit for obtaining the correlation between an output signal of said second coupler and said maximum length sequence of said transmitting unit;

a rectifying and smoothing circuit for rectifying and smoothing an output signal of said correlation unit;

a switching control circuit for switching said selector when the level of an output signal of said rectifying and smoothing circuit becomes lower than a reference value;

a synchronous maximum length sequence generating circuit for producing a demodulating maximum length sequence which is the same as the maximum length sequence used for the spread spectrum modulation of transmission data on the side of the transmitter unit; and a demodulator in which an output signal of said coupler is multiplied by said demodulating maximum length sequence to obtain reception data.

27. A spread spectrum power line carrier frequency communications arrangement in which a transmitter multiplicatively modulates a gold code and transmitting data so as to produce a modulated signal containing spread spectrum transmitting data, the modulated signal being supplied to a power line, whereas a receiver multiplicatively demodulates receiving data from said power line using the same gold code as what is used by the transmitter to form the modulated signal transmitted through the power line and received as said receiving data, wherein the gold code transmitted by said transmitter is identical with a predetermined gold code which is determined according to the address of the transmitter, the gold code being received by the receiver corresponding to the predetermined address of said receiver so that the transmission of the address of the receiver as well as the transmitting data is made unnecessary.

28. An arrangement according to claim 27, wherein the gold codes used by the transmitter and receiver are produced by means of a clock pulse produced synchronously with A.C. power flowing through the power line utilized as a transmission line.

29. A system for spread spectrum power line carrier frequency communications, comprising:

a transmitter unit and a receiver unit connected through a power line utilized as a transmission line, said transmitter unit comprising a clock generator circuit for producing a clock pulse, an address setting unit for setting its own address, a gold code generator circuit responsive to said clock pulse for producing a gold code according to an input from said address setting unit, a modulator circuit for spread spectrum modulating transmitting data using said gold code, and a coupler for supplying the modulated signal generated by said modulator circuit to said power line, and said receiver unit comprising a clock generator circuit for producing a clock pulse synchronous with the clock pulse generated in said transmitter unit, an address setting unit for setting its own address, a gold code generator circuit for producing a gold code in response to the output of said address setting unit on receiving said clock pulse, a coupler for obtaining the modulated signal supplied by said transmitter unit through said power line, and a demodulator for obtaining receiving data by multiplying the output signal of said coupler by the output signal of said gold code generator circuit.

30. A system according to claim 29, wherein the clock pulse generator circuits in said transmitter and receiver units are formed with power supply synchronizing clock generator circuits which produce clock pulses synchronous with A.C. power flowing through said power line.

* * * * *